United States Patent [19]

Kleinberger et al.

[11] Patent Number: 5,762,661
[45] Date of Patent: Jun. 9, 1998

[54] MIST-REFINING HUMIDIFICATION SYSTEM HAVING A MULTI-DIRECTION, MIST MIGRATION PATH

[76] Inventors: Itamar C. Kleinberger, 4367 Dunmore Rd., Marietta, Ga. 30068; John J. Hayman, 1882 Wicks Valley Dr., Marietta, Ga. 30062; Steven L. DeArmoun, 103 Gray St., Adairsville, Ga. 30103; Roland J. Bilodeau, Rte. 6, Box 165, Lusk Ct., Canton, Ga. 30114

[21] Appl. No.: 396,548

[22] Filed: Mar. 1, 1995

Related U.S. Application Data

[63] Continuation-in-part of Ser. No. 278,268, Jul. 21, 1994, abandoned, which is a continuation of Ser. No. 980,301, Nov. 23, 1992, Pat. No. 5,350,117, which is a continuation-in-part of Ser. No. 830,090, Jan. 31, 1992, Pat. No. 5,193, 354.

[51] Int. Cl.$^6$ .................................................. A47F 3/04
[52] U.S. Cl. .............................. 55/227; 55/257.1; 55/271; 96/189; 261/78.2; 261/116; 261/DIG. 14
[58] Field of Search .................. 55/220, 226, 257.1, 55/227, 229, 271; 96/189, 203, 204; 261/78.2, 116, DIG. 4, DIG. 14, DIG. 15, DIG. 34, DIG. 55, DIG. 75, DIG. 85

[56] References Cited

U.S. PATENT DOCUMENTS

| | | | |
|---|---|---|---|
| 733,223 | 7/1903 | L'Heureux et al. | 55/257.1 |
| 924,500 | 6/1909 | Rush . | |
| 1,020,937 | 3/1912 | Warwick . | |
| 1,650,739 | 11/1927 | Ridler . | |
| 1,673,694 | 6/1928 | McLeod . | |
| 1,778,141 | 10/1930 | Birdsong et al. . | |
| 1,860,600 | 5/1932 | Slaymaker . | |
| 1,863,914 | 6/1932 | Tyler . | |
| 1,889,499 | 11/1932 | Rorrer et al. . | |
| 1,908,968 | 5/1933 | Forman . | |
| 1,926,651 | 9/1933 | Rombach | 299/58 |
| 1,950,204 | 3/1934 | Wood et al. | 261/117 |
| 1,951,587 | 3/1934 | Tyler | 299/58 |
| 2,011,731 | 8/1935 | Rorrer et al. | 62/89.5 |
| 2,036,446 | 4/1936 | Tsutsumi | 299/87 |

(List continued on next page.)

FOREIGN PATENT DOCUMENTS

| | | |
|---|---|---|
| 3313399 | 10/1984 | Germany . |
| 2119501 | 11/1983 | United Kingdom . |

OTHER PUBLICATIONS

The Mee Fog System-Humidification Evaporative Cooling Environmental Control-Mee Industries, Inc.-pp. 1–7.

*Primary Examiner*—C. Scott Bushey
*Attorney, Agent, or Firm*—R. Stevan Coursey

[57] ABSTRACT

A mist-refining humidification system for humidifying a controlled environment which incorporates a mist generation means totally immersed within a flowing air stream and a multi-direction, mist migration path to deliver a very fine mist to a humidity controlled environment. In accordance with the most preferred embodiments, the mist-refininig humidification system comprises a mist nozzle assembly positioned within the controlled environment and totally immersed within a laterally flowing air stream to deliver a mist into a mist-refininig assembly. The mist-refining assembly, also located within the controlled environment, defines a mist migration path that includes changing path directions to aid in removing and breaking up larger droplets found in the mist. The mist-refining humidification system further comprises an integral drain assembly located distant from and below the mist nozzle assembly to improve mist yield and to effect drainage of removed water droplets in a direction opposite to the initial direction of the mist migration path. In a first preferred embodiment, the mist-refining assembly further includes components capable of being reoriented relative to one another to enable adaption of the humidification system to meet a variety of physical constraints encountered in different installations. In a second preferred embodiment, the humidification system additionally includes a fan to improve air flow through the mist-refining assembly.

6 Claims, 13 Drawing Sheets

U.S. PATENT DOCUMENTS

| | | | |
|---|---|---|---|
| 2,038,464 | 4/1936 | Wood | 211/127 |
| 2,039,768 | 5/1936 | Bird | 299/62 |
| 2,065,358 | 12/1936 | Zarotschenzeff | 99/194 |
| 2,066,312 | 1/1937 | Bales | 62/89.5 |
| 2,090,326 | 8/1937 | Glattke | 299/58 |
| 2,097,530 | 11/1937 | Peddicord | 62/89.5 |
| 2,263,194 | 11/1941 | Shepherd | 261/30 |
| 2,281,458 | 4/1942 | Schadegg | 62/37 |
| 2,299,046 | 10/1942 | West | 99/154 |
| 2,336,125 | 12/1943 | Preble | 62/170 |
| 2,342,063 | 2/1944 | Sells et al. | 99/168 |
| 2,438,868 | 3/1948 | Trier | 55/257.1 |
| 2,492,308 | 12/1949 | Menges | 99/194 |
| 2,531,506 | 11/1950 | Geneck | 62/89.5 |
| 2,533,913 | 12/1950 | Booth | 62/89.5 |
| 2,584,650 | 2/1952 | Woodruff | 126/113 |
| 2,625,806 | 1/1953 | Kennedy | 62/89.5 |
| 2,633,931 | 4/1953 | Schneider | 55/257.1 |
| 2,826,454 | 3/1958 | Coanda | 239/432 X |
| 3,130,024 | 4/1964 | Vaughan | 55/257.5 X |
| 3,280,887 | 10/1966 | Charurt et al. | 55/257.5 |
| 3,561,194 | 2/1971 | Baldwin et al. | 55/257.5 X |
| 3,563,472 | 2/1971 | Skaptason | 239/511 |
| 3,594,128 | 7/1971 | Singleton | 55/257.1 |
| 3,630,448 | 12/1971 | Chapin | 239/111 |
| 3,708,119 | 1/1973 | Vicard | 239/11 |
| 3,788,542 | 1/1974 | Mee | 239/2 |
| 3,843,056 | 10/1974 | Nye | 239/64 |
| 3,990,427 | 11/1976 | Clinebell | 126/113 |
| 4,058,378 | 11/1977 | Saxton | 55/257.1 |
| 4,179,900 | 12/1979 | Corrigan | 62/247 X |
| 4,629,478 | 12/1986 | Browner et al. | 55/257.1 |
| 4,738,806 | 4/1988 | Noma et al. | 261/81 |
| 4,784,810 | 11/1988 | Jorzyk et al. | 55/257.1 |
| 4,808,303 | 2/1989 | Edwards et al. | 210/138 |
| 4,865,817 | 9/1989 | Burgess et al. | 55/257.1 |
| 4,914,339 | 4/1990 | Hayman, Jr. et al. | 312/115 |
| 4,925,097 | 5/1990 | Corrigan | 239/73 |
| 5,193,354 | 3/1993 | Kleinberger et al. | 62/247 |
| 5,350,117 | 9/1994 | Kleinberger et al. | 239/428.5 |

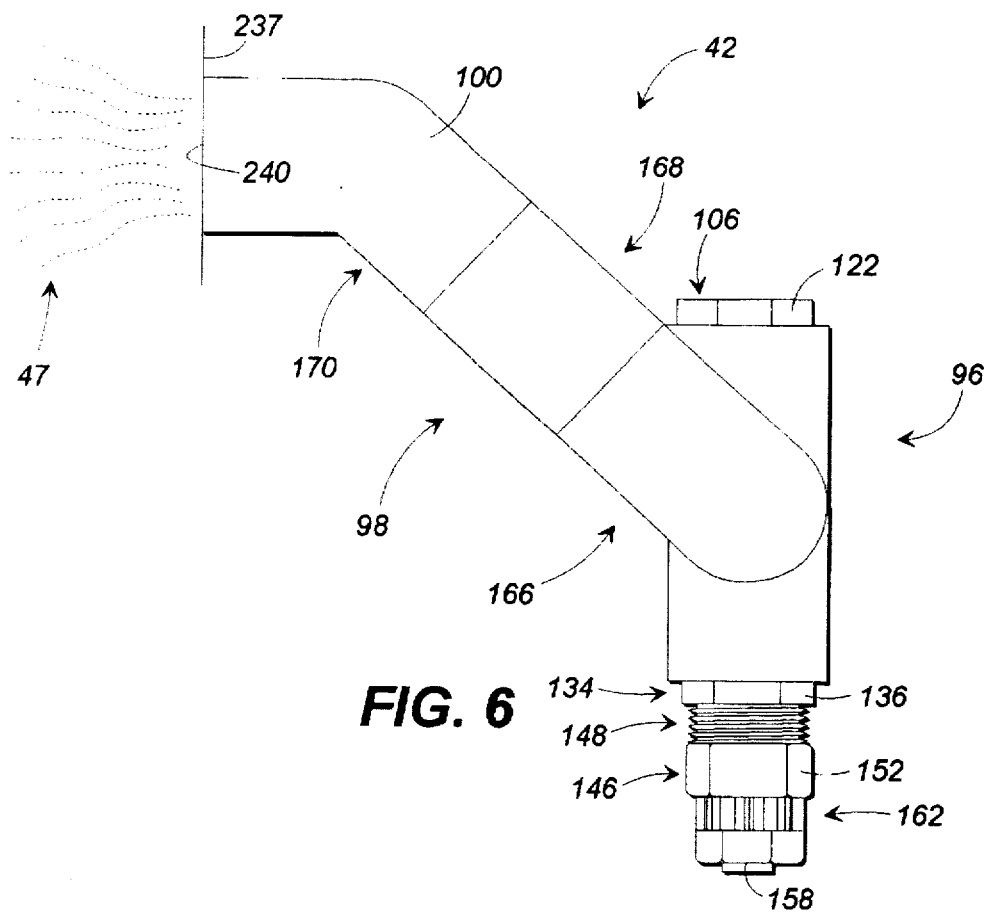
FIG. 6
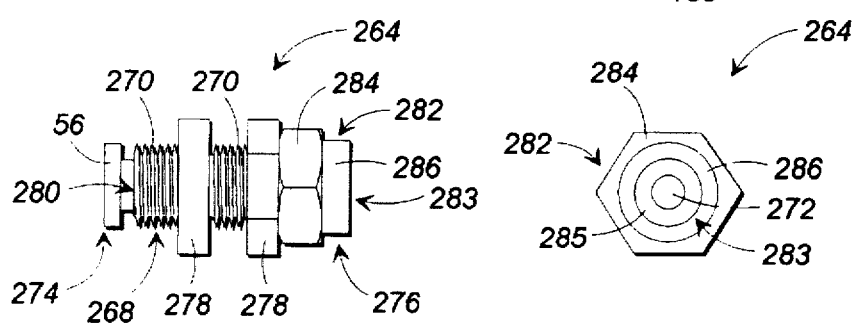
FIG. 7     FIG. 8
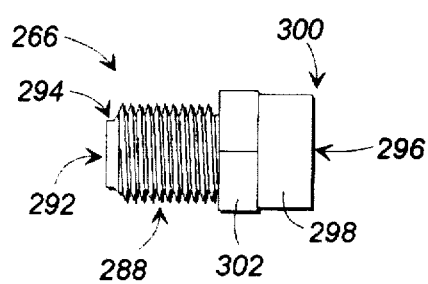  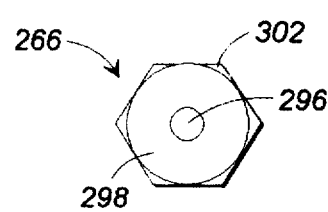
FIG. 9     FIG. 10

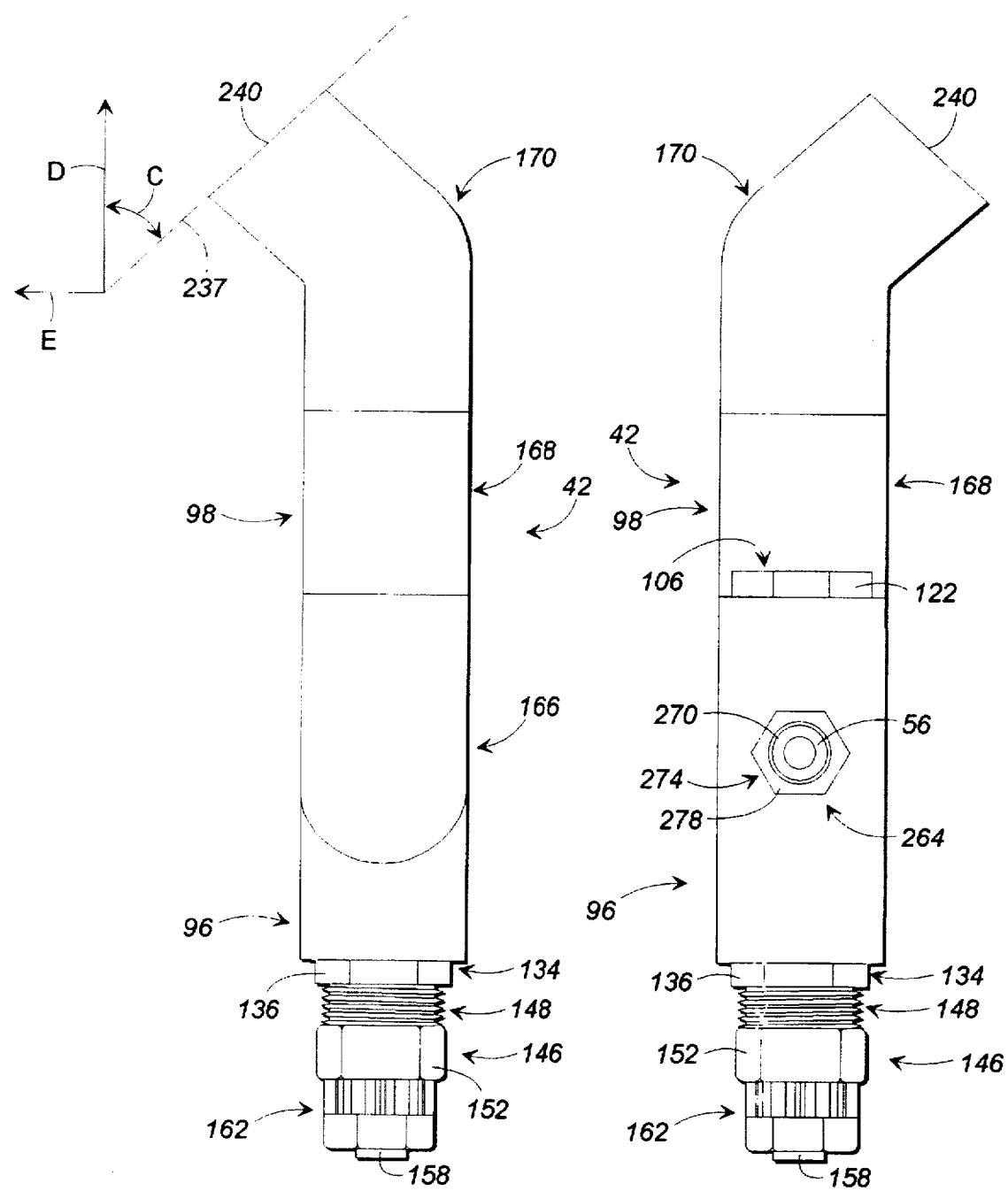
FIG. 12  FIG. 13

MIST-REFINING HUMIDIFICATION SYSTEM HAVING A MULTI-DIRECTION, MIST MIGRATION PATH

CROSS-REFERENCE TO RELATED APPLICATION

This application is a continuation-in-part of application Ser. No. 08/278,268, filed Jul. 21, 1994, now abandoned, which is a continuation of application Ser. No. 07/980,301, filed on Nov. 23, 1992, and now U.S. Pat. No. 5,351,117, which is a continuation-in-part of application Ser. No. 07/830,190, filed Jan. 31, 1992, and now U.S. Pat. No. 5,193,354.

BACKGROUND OF THE INVENTION

The present invention relates generally to the field of humidity control, and, in its most preferred embodiments, to the field of mist-producing humidification systems for refrigerated environments.

Refrigerated air has been utilized, for many years, in enclosed spaces to preserve various items. In some instances, the refrigerated air derives its preserving quality from its temperature. In other instances, the refrigerated air derives its preserving quality from its relative dryness as compared to the air found in the earth's atmosphere. Owing to the preserving quality derived from its temperature, refrigerated air is often utilized to maintain the freshness of refrigerated perishables, such as meats, fish, salads, flowers, and other products, in refrigerated display cases. However, because the refrigerated air contains relatively little moisture, it has an unfortunate tendency to absorb moisture from the perishables, thereby causing them to dry out and deteriorate prematurely. In the past, various efforts have been made to increase the humidity level of refrigerated air. U.S. Pat. Nos. 2,281,458, 4,738,806, 2,531,506, and 2,097,530 disclose several systems claiming to increase the humidity level of refrigerated air.

While the dehydration and deterioration of perishables may be slowed by increasing the humidity level of the refrigerated air, an overabundance of moisture can cause other problems to arise. For instance, humidification systems which produce excessively humid air or, worse, spray moisture directly onto refrigerated perishables can cause certain refrigerated perishables to deteriorate more rapidly and aid in the onset of rotting. In addition, the excessively humid air can encourage the growth of mold, mildew, and other fungi on the perishables and within the refrigerated display case.

Therefore, systems which supply a very fine mist into the refrigerated air are preferable since very small droplets of water tend to evaporate quickly rather than settling and collecting on the refrigerated perishables. Many of the previously developed humidification systems that produce very fine mists are very complex in construction, operation, and maintenance. Additionally, many of these systems invite contamination problems because they incorporate reservoirs of standing water and employ various air atomization techniques. Still other systems are difficult or cumbersome to control with precision and/or are adversely affected by changing environmental factors.

As a result, there is a need in the industry for a humidification system which addresses these and other related, and unrelated, problems.

SUMMARY OF THE INVENTION

Broadly described, the present invention comprises a mist-refining, humidification system which incorporates a mist generation means totally immersed within a flowing air stream and a multi-direction, mist migration path to deliver a very fine mist to a humidity controlled environment. More specifically, the present invention comprises positioning a mist nozzle assembly within the controlled environment and totally immersed within a laterally flowing air stream to deliver a mist into a mist-refining assembly. The mist-refining assembly, also located within the controlled environment, defines a mist migration path that includes changing path directions to aid in removing and breaking up larger droplets found in the mist. The present invention further comprises an integral drain assembly located distant from and below the mist nozzle assembly to improve mist yield and to effect drainage of removed water droplets in a direction opposite to the initial direction of the principle mist migration path.

In its most preferred embodiments, the present invention includes a water control unit connected to a water source for supplying water at constant pressures, a dual-cycle timer for controlling the operation of the water control unit according to pre-determined timer settings, a first tubing network for transferring pressurized water from the water control unit, a second tubing network for draining removed water, and a misting assembly located within the controlled environment and connected to the first tubing network to receive pressurized water transferred from the water control unit and to the second tubing network to enable the draining of water droplets removed from the mist. The misting assembly further includes a mist nozzle assembly immersed in an air stream flowing in the initial direction of the principle migration path as defined by a mist-refining portion of the misting assembly. The mist-refining portion removes and breaks up larger mist droplets before releasing a very fine mist into the controlled environment outside the misting assembly. Additionally, the misting assembly includes a drain assembly located below the distant mist nozzle assembly.

According to the first preferred embodiment of the present invention, the misting assembly comprises a base portion which defines a nozzle passageway for receipt of the mist nozzle assembly. The base portion further defines air intake, mist, and drain portals. The mist nozzle assembly includes a connector for receiving a water supply tube and an orifice for spraying water droplets in the form of a mist. A refining portion adjustably extends from the base portion to receive mist-laden air passing through the mist portal and to define the mist migration path through the misting assembly. The refining portion is rotatable relative to the base portion to enable modification of the mist delivery direction. The refining portion includes a delivery nozzle that is rotatable relative to the remainder of the refining portion to enable increased control over the mist delivery direction. The drain portal of the base portion is located below and distant to the orifice of the mist nozzle assembly and allows passage of draining water to a connected drain tube.

In a second preferred embodiment of the present invention, the misting assembly comprises a refining portion held in position by a plurality of supports. The refining portion defines an air intake portal and a drain portal near a first end. A fan, connected adjacent to the first end, supplies air to the refining portion through the air intake portal in the initial direction of the mist migration path. The refining portion receives a mist nozzle assembly having an orifice totally immersed within the air supplied by the fan. The orifice is directed at a glass tube extending within the refining portion and housing an ultraviolet light for bacteria reduction. Near a second end, the refining portion includes a delivery nozzle that changes the direction of the principal mist migration path and enables a very fine mist to exit into the controlled space. The drain portal is connected to a drain tube for removal of water from the refining portion.

It is therefore an object of the present invention to humidify a controlled environment by releasing a very fine mist into the controlled environment.

Yet another object of the present invention is to humidify a controlled environment with a humidification system which is easy to install and maintain in both pre-existing and new refrigerated cases.

Still another object of the present invention is to humidify a controlled environment with a sanitary humidification system that is free from contamination problems related to standing water and various air atomization techniques.

Still another object of the present invention is to humidify a controlled environment by introducing mist in such a form and at such a controlled rate that air within the environment remains humid while moisture does not settle on perishables.

Still another object of the present invention is to humidify a controlled environment which includes a mist nozzle assembly for the introduction of mist in an amount that is primarily governed by controlling the supply of water to the mist nozzle assembly.

Still another object of the present invention is to humidify a controlled environment with an inexpensive humidification system.

Still another object of the present invention is to humidify a controlled environment with a humidification system which includes a water control unit connected to a water supply, which water control unit includes a filter, a high pressure pump, a pump bypass loop for providing constant water pressure, and a timer for controlling misting cycles.

Still another object of the present invention is to humidify a controlled environment with a humidification system which includes a mist nozzle assembly which emits a mist of separate droplets and a mist-refining assembly which sorts the droplets of the mist emitted from the mist nozzle assembly to sort out and drain larger droplets to release a refined mist.

Still another object of the present invention is to humidify a controlled environment with a humidification system which includes a mist nozzle assembly which emits a mist of separate droplets and a mist-refining assembly which breaks up the larger droplets of the mist emitted from the mist nozzle assembly into smaller droplets for release as a refined mist.

Still another object of the present invention is to humidify a controlled environment with a humidification system which includes a mist nozzle assembly which emits a mist of separate droplets and a mist-refining assembly which defines a cavity for receiving the mist and a mist migration path that turns from an initial direction into a second direction.

Still another object of the present invention is to humidify a controlled environment with a humidification system which includes a mist nozzle assembly which emits a mist of separate droplets and a mist-refining assembly which defines a cavity for receiving the mist and a mist migration path that turns from an initial direction into a second direction before the mist exits through a delivery aperature into the controlled environment.

Still another object of the present invention is to humidify a controlled environment with a humidification system which includes a mist nozzle assembly and a mist-refining assembly which are both removably located within the refrigerated space of a refrigerated case.

Still another object of the present invention is to humidify a controlled environment with a humidification system which includes a mist nozzle assembly with an orifice for emission of a mist immersed entirely in a flowing air stream and a cavity for receiving the mist, the air in the cavity flowing about the mist nozzle assembly primarily in response to the entrainment of air by the mist.

Still another object of the present invention is to humidify a controlled environment with a humidification system which includes a mist nozzle assembly with an orifice for emission of a mist and a mist-refining assembly which defines a cavity about the orifice, the air in the cavity being pulled into the cavity at least partially in response to the entrainment of air by the mist.

Still another object of the present invention is to humidify a controlled environment with a humidification system which includes a mist nozzle assembly which emits a mist of separate droplets, a mist-refining assembly which removes the larger droplets of the mist emitted from the mist nozzle assembly for drainage, and a drainage assembly located below and distant to the mist nozzle assembly to improve drainage and prevent fouling of the mist nozzle assembly, thereby increasing mist production.

Still another object of the present invention is to humidify a controlled environment with a humidification system including a misting assembly which is simple in construction and relatively small in size.

Other objects, features and advantages of the present invention will become apparent upon reading and understanding this specification, taken in conjunction with the accompanying drawings.

BRIEF DESCRIPTION OF THE FIGURES

FIG. 6 is aright side elevational view of a misting assembly of FIG. 1 showing the preferred orientation of the delivery nozzle.

FIG. 7 is a front elevational view of a coupling sub-assembly utilized by a misting assembly of FIG. 1.

FIG. 8 is a right side elevational view of a coupling sub-assembly of FIG. 1.

FIG. 9 is a front elevational view of a mist sub-assembly utilized by a misting assembly of FIG. 1.

FIG. 10 is a night side elevational view of a mist sub-assembly of FIG. 1.

FIG. 12 is a right side elevational view of a misting assembly of FIG. 1.

FIG. 13 is a left side elevational view of a misting assembly of FIG. 1.

DETAILED DESCRIPTION OF THE FIRST PREFERRED EMBODIMENT

Figure 1:
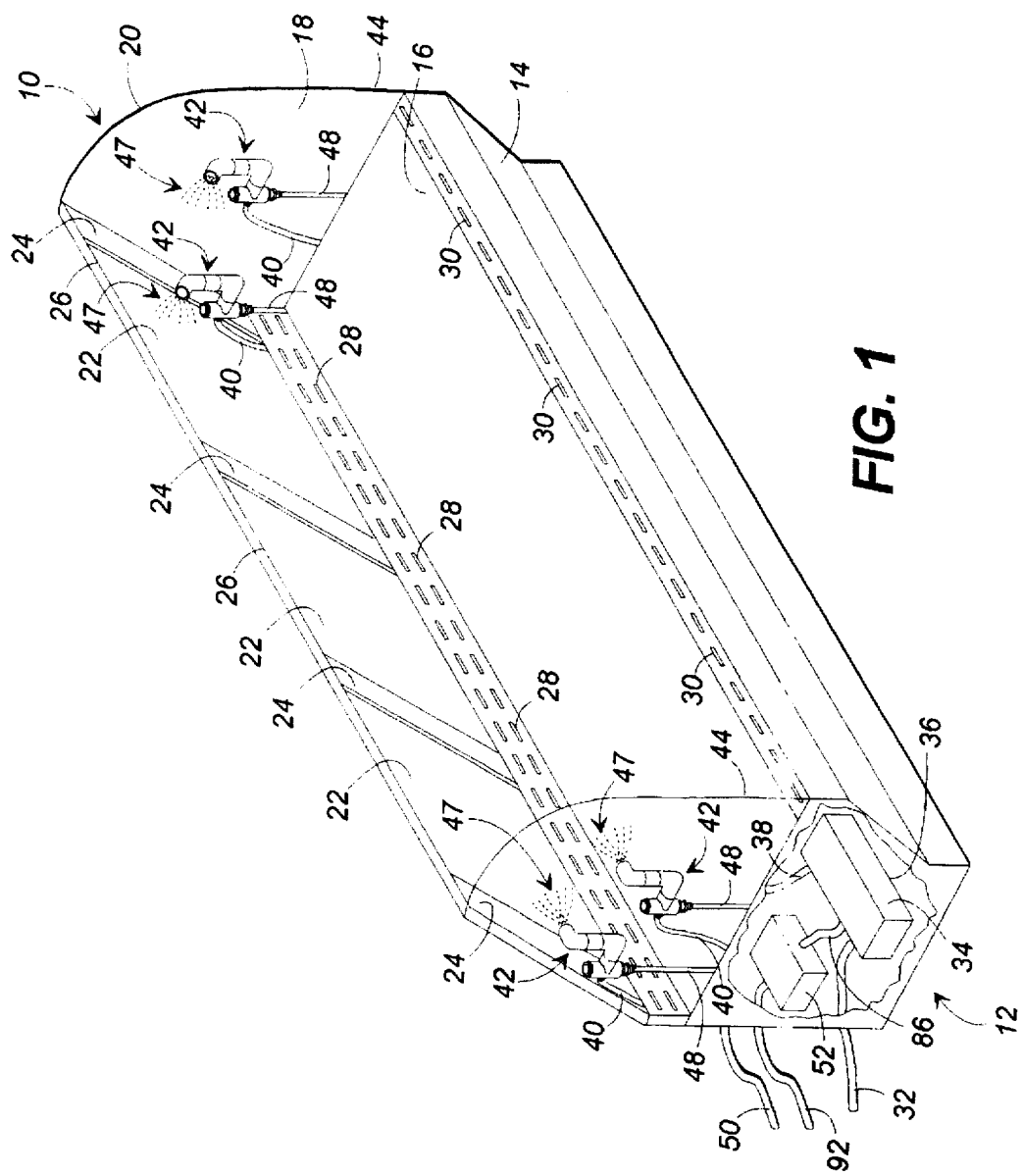
FIG. 1 is a front perspective view of a mist-refining humidification system, in accordance with a first preferred embodiment of the present invention, installed in a conventional refrigerated case.

Referring now in greater detail to the drawings, in which like numerals represent like components throughout several views, and in accordance with the most preferred embodiments of the present invention, a refrigerated case 10 with a mist-refining humidification system 12 is shown in FIG. 1. The refrigerated case 10 includes a case base 14 supporting a product display surface 16. The product display surface 16 is located within a refrigerated space 18 which is enclosed by a glass hood 20 and sliding doors 22. The sliding doors 22 are supported by support posts 24 which are tied together by a support header 26. Refrigerated air supply vents 28 enable cool air to enter refrigerated space 18, while refrigerated air return vents 30 remove air from the refrigerated space 18 to be refrigerated and returned through the refrigerated air supply vents 28.

Enclosed within the case base 14 is a customary, forced-air refrigeration system (not shown) whose design and operation are considered well-known within the industry One example of an acceptable refrigerated case 10 is the LCD model manufactured by Tyler Refrigeration Corporation of Niles, Mich. It should be understood that the particular refrigerated case 10 shown in FIG. 1 is included by way of example only, and that alternately designed refrigerated cases 10 are included in alternate embodiments of the present invention. In one alternate embodiment, a gravity case is utilized which includes cooling coils supported in the upper portion of the refrigerated case 10, thus utilizing convection currents to circulate the cool air. Without limitation, other embodiments include product display surfaces 16 which include grated platforms and draining formations for disposing of juices and other droppings from perishables displayed in the refrigerated case 10. In other alternate embodiments of the present invention, refrigerated cases 10 have refrigerated spaces 18 which are not completely enclosed. Furthermore, other alternate embodiments include cases 10 which are cooled with ice rather than refrigeration systems, and still others include cases which are heated, rather than cooled. In still other embodiments, the controlled spaces are neither heated nor cooled but simply need increases in humidity for various purposes. in accordance with the most preferred embodiments of the present invention, the mist-refining humidification system 12 shown in FIG. 1 includes a tap supply hose 32 connected to a water supply, such as a utility water outlet (not shown). Connected to the tap supply hose 32 is a water control unit 34 which sits on a base 36 that is mounted inside the refrigerated case 10. In alternate embodiments of the present invention, the water control unit 34 is mounted outside the refrigerated case 10. A supply header 38, shown leading from the water control unit 34, connects the water control unit 34, through conventional tubing connectors, to a number of supply tubes 40. Each of the supply tubes 40 is connected to a misting assembly 42, each of which is supported from a side wall 44 of the refrigerated case 10 and emits a fine mist 46 into the refrigerated space 18. A drain tube 48 leads away from each misting assembly 42 to connect with a drain header 50 which leads away from the refrigerated case 10 to a standard drainage or sewage system. All of the humidification system tubing elements 32, 40, 48, 50, running through the refrigerated case 10 are positioned away from cold refrigeration elements to prevent freezing of water within the tubing elements 32, 40, 48, 50. It should be understood that the scope of the present invention, includes, consistent with the teachings and objects of the present invention, variations in the number, locations, and orientations of the misting assemblies 42 (and associated supply and drain tubes 40, 48) depending on the size and shape of the refrigerated case 10, as well as other environmental considerations including the types of perishables and placement of the refrigerated case 10. For example, in alternate embodiments, the misting assemblies 42 are mounted close to the product display surface 16 or are angled in alternate directions. With respect to alternate embodiments, including alternate cases, the misting assemblies 42 are mounted to various surfaces, including support structures, or, in forced air cases 10 having supply vents 28 in the front, the misting assemblies 42 may be mounted between the product display surface 16 and the drain pan so that mist-laden air 47 mixes with the refrigerated air before it enters the refrigerated space 18. It should also be understood that the scope of the present invention includes variations with respect to the drainage of water from the misting assemblies 42. For instance, in an alternate embodiment, each drain tube 48 leads away from a misting assembly 49 in a downward vertical direction to a drain pan at the bottom of the refrigerated case 10.

Figure 2:
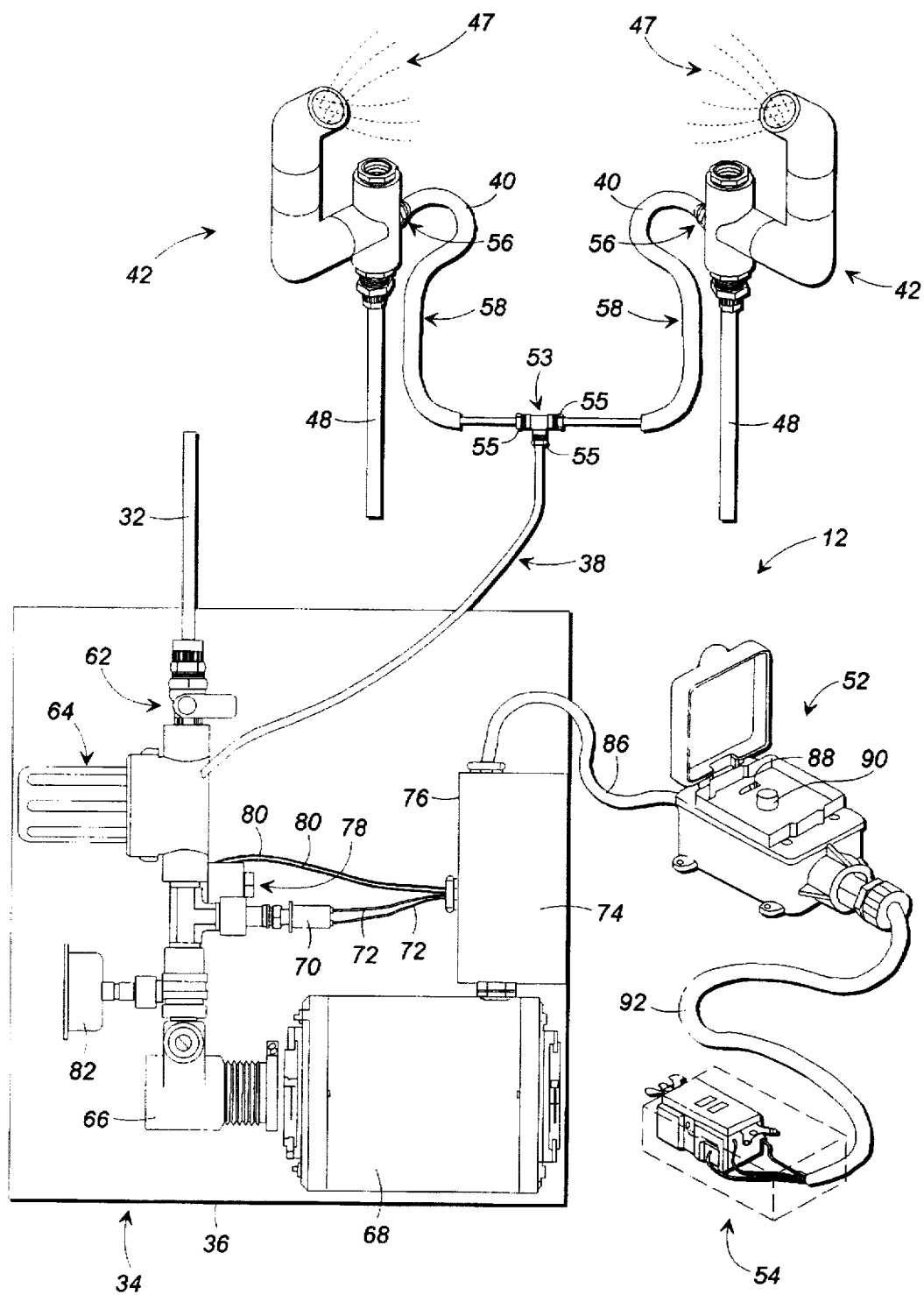
FIG. 2 is a schematic representation of the mist-refining humidification system of FIG. 1.

FIG. 2 displays a schematic representation of the mist-refining, humidification system 12, including a pair of misting assemblies 42, a water control unit 34, a timer 52, and a circuit interrupter 54. Preferably, the circuit interrupter 54 is a conventional ground-fault, circuit breaker. The misting assemblies 42 are connected to and receive water from the water control unit 34 through a supply header 38 and supply tubes 40. Preferably, the supply header 38 and supply tubes 40 are ¼-inch high pressure polytubing. The supply header 38 extends from the water control unit 34 to a conventional T-fitting 53 having barb-type compression connectors 55. From the T-fitting 53, a supply tube 40 extends to each misting assembly 42, where it connects, preferably, to a standard ferrule fitting 56 (also referred to as a push-in type fitting) protruding from the misting assembly 42. Because a portion 58 of a supply tube 40 in close proximity to the misting assemblies 42 may be exposed to the refrigerated space 18, water may tend, under certain circumstances, to freeze within a supply tube 40. Therefore, the supply tubes 40 are jacketed, preferably, by ½-inch polytubing to reduce the likelihood that such freezing may occur. Such jacketing also protects the supply tubes 40 from potentially being cut by sharp metal edges. A drain tube 48 is connected between each misting assembly 42 and a sewer or drainage system (not shown) to carry away any water removed by the misting assembly 42.

FIG. 2 also displays the elements of the water control unit 34 in accordance with the most preferred embodiments of the present invention. Tap supply hose 32, preferably, ½-inch polytubing, is connected to the supply side of an intake valve assembly 62 to supply water to the control unit 34. The intake valve assembly 62 is, preferably, a ball valve. The delivery side of the intake valve assembly 62 is coupled to a filter 64 which removes particulates suspended in the incoming water to forestall future clogging of the misting assemblies 42. The filter 64 is joined to the intake side of a high pressure pump 66 which is driven by an electric motor 68. Preferably, the electric motor is a 110 volt, ¼-horsepower motor. Between the filter 64 and the high pressure pump 66 is a low pressure switch 70 having feedback signal lines 72 that lead to a power supply logic assembly 74 housed in power supply box 76. The delivery side of the high pressure pump 66 is connected to a solenoid actuated valve 78 that receives actuation signals through actuation control lines 80 from the power supply logic assembly 74. The solenoid actuated valve 78 is joined to the supply header 38 which feeds the misting assemblies 42 with water. A pressure gauge 82 is located between the high pressure pump 66 and the solenoid actuated valve 78 to provide an operator with a visual indication of the pump 66 outlet pressure.

The power supply logic assembly 74, in power supply box 76, is connected electrically to a timer 52 via electrical cable 86. The timer 52 is, preferably, a conventional dual-timer unit known to those in the industry and has a first timing circuit and a second timing circuit. The timer 52 also has a sliding on-off switch 88 which controls operation of the entire timer 52 and a timing adjustment knob 90 which controls the first timing circuit. Preferably, the timer 52 is located external to water the control unit 34. An electrical cable 92 connects the timer 52 with the circuit interrupter 54 which is, preferably, mounted near a 110-volt, alternating-current power supply (not shown). Operation of the timer 52 and water control unit 34 is discussed in detail below.

Figure 3:
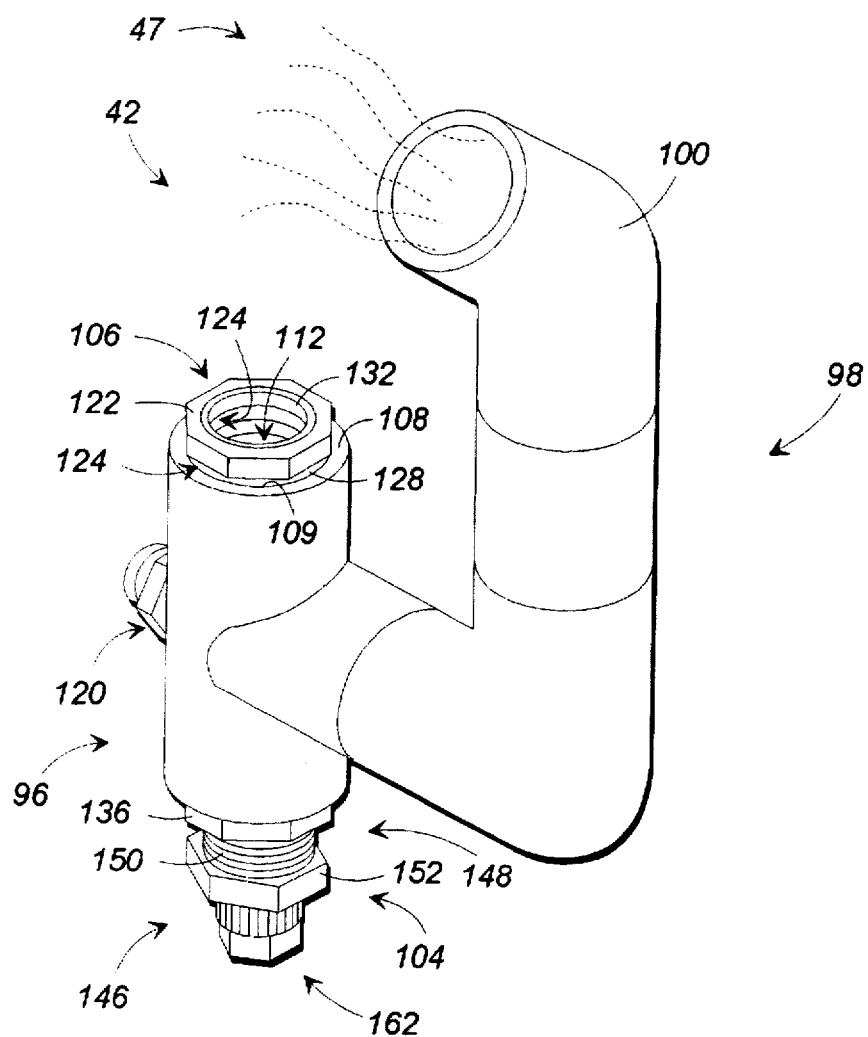
FIG. 3 is a front perspective view of a misting assembly of FIG. 1.

Referring now to FIG. 3, which shows a front perspective view of an isolated misting assembly 42, in accordance with a first preferred embodiment of the present invention, the misting assembly 42 includes a base portion 96 and a refining portion 98 adjustably adjoining the base portion 96. The base portion 96 and the refining portion 98 are oriented, preferably, in an upright attitude with the refining portion 98 abutting the base portion 96 and then extending away from the base portion 96 to turn into a, generally, vertical direction. Because the refining portion 98 is adjustably coupled to the base portion 96, the refilling portion 98 is rotatable relative to the base portion 96, thereby enabling directional control over the fine mist 46 released from the refining portion 98. In addition, to provide increased directional control, the refining portion 98 includes a delivery nozzle 100 that is rotatable relative to the remainder of the refining portion 98. Preferably, the relative positioning of the base portion 96 and the refining portion 98, including its delivery nozzle 100, results in the fine mist 46 leaving the delivery nozzle 100 in a, generally, horizontal direction as shown in the right side elevational view of FIG. 4 in which the refining portion 98 has been rotated relative to the base portion 96.

To interact with the remainder of the mist-refining, humidification system 12, the base portion 96, as illustrated in FIG. 3, includes a mist nozzle assembly 120 that connects to a supply tube 40 (see FIG. 2). The base portion 96 also includes a drain assembly 104 that connects to a drain tube 48 (see FIG. 2) and an air intake coupling 106 through which air enters the misting assembly 42. These components are described in greater detail below.

Figure 4:
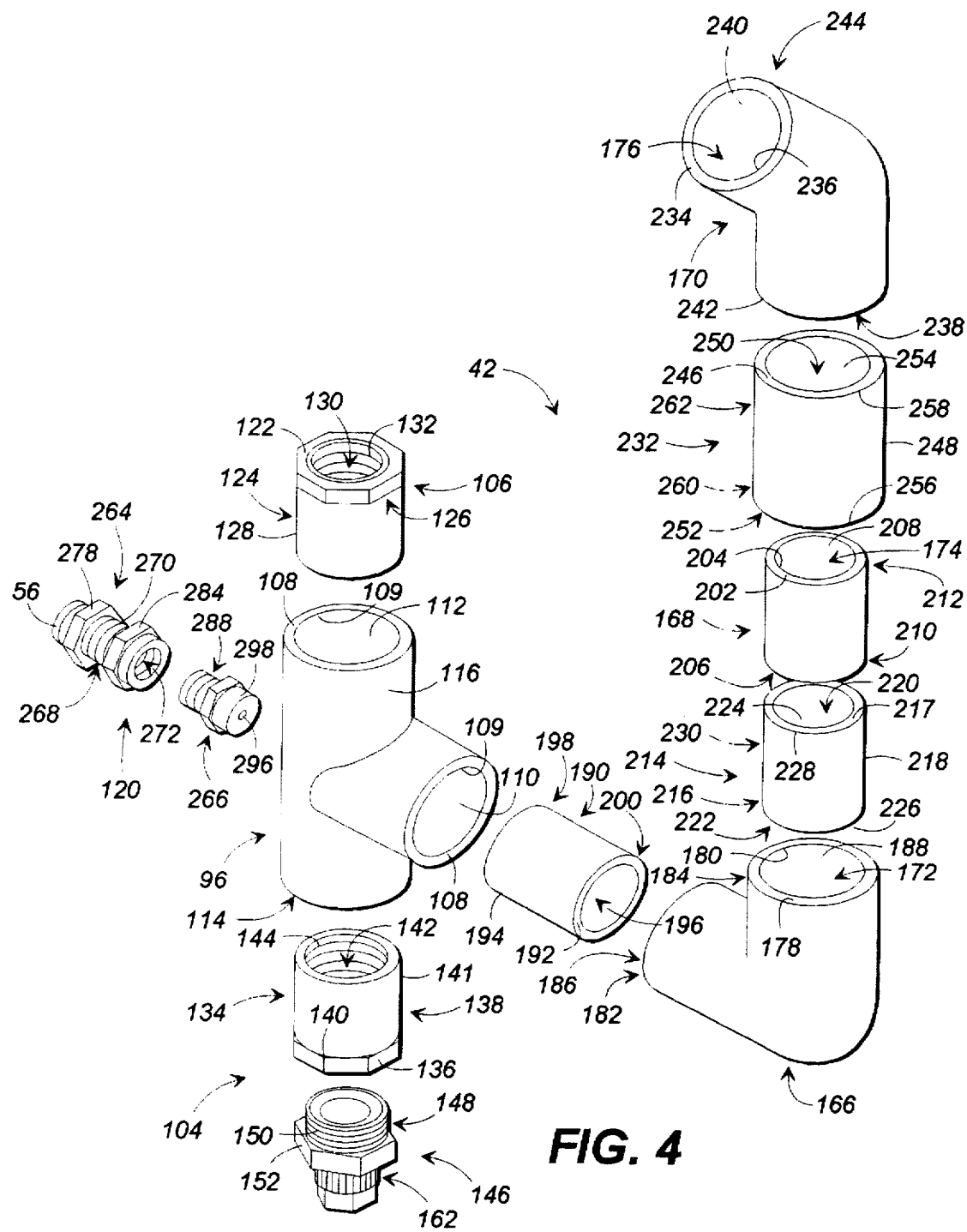
FIG. 4 is an exploded, front perspective, schematic view of a misting assembly of FIG. 1.
Figure 5:
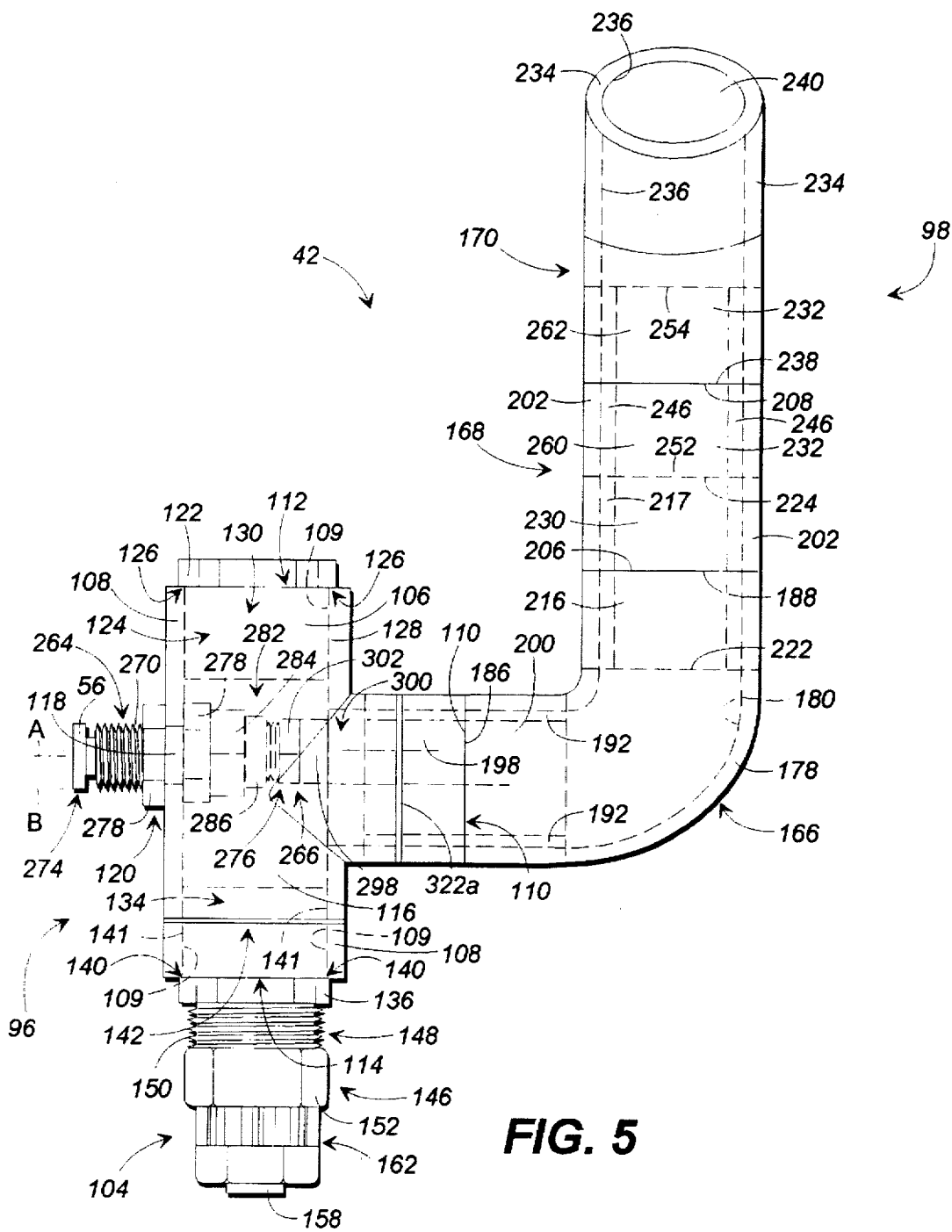
FIG. 5 is a front elevational view of a misting assembly of FIG. 1.

The component parts of the misting assembly 42 and their relationship to one another in accordance with the first preferred embodiment, are displayed by the exploded, front perspective, schematic view of FIG. 4 and the front view of FIG. 5. The base portion 96 of the misting assembly 42 is, preferably, manufactured from a conventional, ¾-inch, Schedule 40, polyvinylchloride (also referred to as PVC) T-fitting normally used in piping systems. The base portion 96 includes a wall 108 that defines a mist portal 110, an air intake portal 112, and a drain portal 114. The wall 108 has an internal surface 109 that defines an internal cavity 116 which communicates with each of the portals 110, 112, 114. The wall 108 also defines a, preferably, round passageway 118 (see FIG. 5) opposite the mist portal 110 and having a centerline "A". The passageway 118 is positioned so that its centerline, "A", preferably extends above the centerline, "B", of the mist portal 110. As seen in FIG. 5, the passageway 118 receives a mist nozzle assembly 120 (described in more detail below). Because the centerline, "A", of the passageway 118 is located above the centerline, "B", of the mist portal 110, the mist nozzle assembly 120 is positioned above the centerline, "B", of the mist portal 110. It is believed that locating the mist nozzle assembly 120 above the centerline, "B", of the mist portal 110 prevents fouling of the mist nozzle assembly 120 by water droplets flowing toward the drain portal 114.

The air intake portal 112, as shown in FIGS. 3, 4,and 5, receives the air intake coupling 106 which extends downward into the internal cavity 116 toward the mist nozzle assembly 120. The air intake coupling 106 is, preferably, a conventional, molded-plastic, internally-threaded insert used by the plumbing or piping industry and has a head 122 and an internally-threaded portion 124. A shoulder 126 is present at the location where the head 122 adjoins the internally-threaded portion 124. The shoulder 126 is positioned so that it abuts the wall 108, while the internally-threaded portion 124 extends partially into the internal cavity 116 of the base portion 96. The internally-threaded portion 124 has an outer surface 128 that is, preferably, smooth and rests against the inner surface 109 of the wall 108. The internally-threaded portion 124 and, hence, the entire air intake coupling 106, is secured in place, preferably, by cementing its outer surface 129 to the inner surface 109 of the wall 108. The head 122 and the internally-threaded portion 124 define a passageway 130 lined by internal threads 132. The passageway 130 communicates with the internal cavity 116 of the base portion 96 to enable air to enter the misting assembly 42. In an alternate embodiment, the air intake coupling 106 is connected to an air supply assembly (not shown) to improve air flow into the misting assembly 42. In another alternate embodiment, the air intake coupling 106 receives a fitting which effectively reduces the size of the passageway 130, thereby restricting and, perhaps, cutting off, the flow of air into the misting assembly 42.

The drain portal 114 receives the drain assembly 104 as displayed in FIGS. 3, 4, and 5. The drain assembly 104, in accordance with the first preferred embodiment of the present invention, includes a drain coupling 134 which upwardly extends into the internal cavity 116 toward the mist nozzle assembly 120. The drain coupling 134 is, preferably, a conventional, molded-plastic, internally-threaded insert used by the plumbing or piping industries. Like the air intake coupling 106, the drain coupling 134 has a head 136 and an internally-threaded portion 138. A shoulder 140 is oriented to abut the wall 108 of the base portion 96, while the internally-threaded portion 138 extends partially into the internal cavity 116. The internally-threaded portion 138 has an outer surface 141 that is, preferably, smooth and rests against the inner surface 109 of the wall 108. The internally-threaded portion 138 and, hence, the entire drain coupling 134, is secured in place, preferably, by cementing its outer surface 141 to the inner surface 109 of the wall 108. The head 136 and the internally-threaded portion 138 define a passageway 142 lined by internal threads 144. The passageway 142 communicates with the internal cavity 116 of the base portion 96 to enable water droplets, removed from the mist-laden air by the refining portion 98, to drain away from the misting assembly 42.

The drain assembly 104 also includes a threaded-connector 146 that resides partially within the drain coupling 134. The threaded-connector 146 is, preferably, a conventional, molded-plastic, barb-type connector used by the plumbing or piping industries. The threaded-connector 146 includes a first externally-threaded portion 148 that extends partially into the drain coupling 134 and has threads 150 that engage the internal threads 144 of the drain coupling 134. The threaded-connector 146 also includes a nut 152 that separates the first externally-threaded portion 148 from a second externally-threaded portion having threads (hidden form view). A barb 158 (see FIG. 5) extends from the second externally-threaded portion and into a drain tube 48 (see FIG. 2). An internal passageway (hidden from view) extends, within the threaded-connector 146, from the first externally-threaded portion 148 to the barb 158 and enables water droplets to pass from the drain coupling 134, through the threaded-connector 146, and into a drain tube 48. A conventional compression-type fitting 162 having internal threads (hidden from view) defines a passageway (hidden from view) through which a drain tube 48 passes after connection to the barb 158. The internal threads of the compression-type fitting 162 engage the threads of the second externally-threaded portion to secure the compression-type fitting 162 in place.

In accordance with the first preferred embodiment of the present invention, the refining portion 98 of the mist assembly 42 includes includes a first elbow segment 166 (preferably, a 90-degree elbow), a straight segment 168, and a second elbow segment 170 that define internal cavities 172,174,176, respectively. The first elbow segment 166 is, preferably, a ninety (90) degree elbow having a wall 178 with an inner surface 180. The first elbow segment 166 also has a first end 182 and a second end 184 that define first and second openings 186,188, respectively As seen in FIGS. 4 and 5, a first sleeve coupling 190 adjustably joins the first elbow segment 166 to the base portion 96. The first sleeve coupling 190 has a wall 192, with an outer surface 194, and defines an internal passageway 196. A first portion 198 of the first sleeve coupling 190 extends partially through the mist portal 110 and into the base portion 96 so that the outer surface 194 rests adjacent to the inner surface 109 of the wall 108. The outer surface 194 is not secured to the inner surface 109 of the wall 108, thereby enabling the first sleeve coupling 190 to rotate relative to the base portion 96. A second portion 200 of the first sleeve coupling 190 extends partially through the first opening 186 of the first elbow segment 166 to abut the first end 182 of the first elbow segment 166 against the wall 108 of the base portion 96 and to bring the internal cavity 172 of the first elbow segment 166 into communication, via the internal passageway 196 of the first sleeve coupling 190, with the internal cavity 116 of the base portion 96. The inner surface 180 of the first elbow segment 166 rests against the outer surface 194 of the first sleeve coupling 190 and is rigidly held in place, preferably, by cementing. Because the first elbow segment 166 is secured to the first sleeve coupling 190 and the first sleeve coupling 190 is rotatable relative to the base portion 96, the first elbow segment 166 is rotatable relative to the base portion 96 as well.

The straight segment 168 of the refining portion 98 is positioned between the first elbow segment 166 and the second elbow segment 170. The straight segment 168 has a wall 202 with an inner surface 204. The wall 202 defines first and second openings 206, 208 that communicate with the internal cavity 174. The first and second openings 206, 208 are located at first and second ends 210, 212, respectively, of the straight segment 168. The straight segment 168 is connected to the first elbow segment 166 by a second sleeve coupling 214 having a first portion 216 that extends partially into the first elbow segment 166 through the elbow's second opening 188. The second sleeve coupling 214 includes a wall 217, with an outer surface 218, that defines an internal passageway 220. The second sleeve coupling 214 also defines first and second openings 222, 224 at first and second ends 226, 228, respectively. As seen in FIG. 5, the first portion 216 of the outer surface 218 of the second sleeve coupling 214 rests against and contacts the inner surface 180 of the first elbow segment 166. The two surfaces 218, 180 are not secured to one another, thus enabling the second sleeve coupling 214 to be removed from the first elbow segment 166. A second portion 230 of the second sleeve coupling 214, including second end 228 and second opening 224, extends through the first opening 206 of the straight segment 168 to reside partially within the straight segment 168, thereby abutting wall 202 of the straight segment 168 against wall 178 of the first elbow segment 166 and placing the internal cavity 172 of the first elbow segment 166 into communication with the internal cavity 174 of the straight segment 168, via the internal passageway 220 of the second sleeve coupling 214. The straight segment 168 and the second sleeve coupling 214 are rigidly connected, preferably, by cementing the inner surface 204 of the straight segment 168 to the outer surface 218 of the second sleeve coupling 214.

The straight segment 168, in accordance with the first preferred embodiment of the present invention, is rotatably connected to the second elbow segment 170 by a third sleeve coupling, 232. The second elbow segment 170 (also referred to herein as the delivery nozzle 170) has a wall 234 with an inner surface 236 and defines first and second openings 238, 240 at first and second ends 242, 244, respectively. The second opening 240 (also referred to herein as the delivery aperature 240) and surrounding wall 234 of the second elbow segment 170 form a planar face referred to herein as the delivery plane 237 (see FIG. 6). Preferably, the delivery plane 237 is coplanar with a vertical plane as shown in FIG. 4. However, because the refining portion 98 is rotatable relative to the base portion 96, the refining portion 98 is positionable in different attitudes, thereby causing the delivery plane 237 to form various angles with a vertical plane. In addition, because the second elbow segment 170 is rotatable relative to the remainder of the refining portion 98, the delivery plane 237 is positionable in a variety of other angles as well. Referring back to FIGS. 4 and 5, the first and second openings 238, 240 of the second elbow segment 170 are in communication with the internal cavity 176 and allow mist-laden air to flow through the second elbow segment 170.

The third sleeve coupling 232 includes a wall 246, with an outer surface 248, that defines an internal passageway 250. The third sleeve coupling 232 also defines first and second openings 252, 254 at first and second ends 256, 258, respectively. A first portion 260 of the third sleeve coupling 232, including first opening, 252 and first end 256, extends partially through the second opening 208 of the straight segment 168 to place the inner cavity 174 of the straight segment 168 into communication with the internal passageway 250. The first portion 260 of the outer surface 248 of the third sleeve coupling 232 rests adjacent to, but is not secured to, the inner surface 204 of the straight segment 168, thereby enabling the third sleeve coupling 232 to be removed from and rotate relative to the straight segment 168. A second portion 262 of the third sleeve coupling 232, including second opening 254 and second end 258, extends partially through the first opening 238 at the first end 242 of the second elbow segment 170 and places a portion 262 of the outer surface 248 of the third sleeve coupling 232 into contact with the inner surface 236 of the second elbow segment 170. Because the outer surface 248 is secured to the inner surface 236, preferably, by cementing, and because the third sleeve coupling 232 is rotatable relative to the straight segment 168, the second elbow segment 170 is rotatable relative to the straight segment 168 and, hence, to the remainder of the misting assembly 42. Also, by extending partially into the second elbow segment 170, the third sleeve coupling 232 causes the second elbow segment 170 to abut the straight segment 168 and enables its internal passageway 250 to communicate with the internal cavity 176 of the second elbow segment 170.

In accordance with the first preferred embodiment of the present invention, elbow segments 166, 170, straight segment 168, and sleeve couplings 190, 214, 232 are, preferably, conventional, ¾-inch, Schedule 40 PVC fittings used by the plumbing and piping industries. Also, the second elbow segment 170 is, preferably, a 135-degree elbow. However, in alternate embodiments, the second elbow segment 170 is, preferably, a 45-degree or 90-degree elbow. It should also be understood that the scope of the present invention includes base and refining portions 96, 98 that are, in alternate embodiments, comprised of a greater, or lesser, number of component parts.

As shown in the front view of FIG. 5, the passageway 118 of wall 108 receives the mist nozzle assembly 120 which extends, inside the internal cavity 116 of the base portion 96, toward the mist portal 110 and also toward the opposite inner surface 180 of the first elbow segment 166. The mist nozzle assembly 120 is comprised of a coupling sub-assembly 264 (see FIGS. 7 and 8) and a mist sub-assembly 266 (see FIGS. 9 and 10) threadedly joined to the coupling sub-assembly 264. The coupling sub-assembly 264 includes an externally-threaded insert 268 having threads 270 and defining an internal chamber 272. The coupling sub-assembly 264 extends through the passageway 118 and has a first end 274 that resides outside wall 108, while a second end 276 resides inside the internal cavity 116. A pair of internally-threaded nuts 278 are located about the externally-threaded insert 268 and engage threads 270. The nuts 278 abut the wall 108 to secure the coupling sub-assembly 264 and, hence, the mist nozzle assembly 120 in position. A first opening 280 at the first end 274 of the coupling sub-assembly 264 receives the ferrule fitting 56 (also known as a push-in type fitting) and enables fluid communication between the ferrule fitting 56 and the internal chamber 272. The ferrule fitting 56 is also connected to a supply tube 40 (see FIG. 2) that provides water to the mist nozzle assembly 120.

The coupling sub-assembly 264 also includes an adapter 282, a second opening 283 at its second end 276, and a nut 284 integrally formed as part of the adapter 282. The adapter 282 defines an internal passageway 285 that enables fluid communication with the internal chamber 272 of the externally-threaded insert 268 via the second opening 283. The adapter 282 has an internally-threaded reducer 286 that receives an externally-threaded portion 288 of the mist sub-assembly 266. As shown more clearly in FIG. 9, the mist sub-assembly 266 defines an internal passageway (hidden from view) that provides fluid communication with the internal passageway 285 of the adapter 282 and, hence, with the internal chamber 272 of the externally-threaded insert 268. The internal passageway of the mist sub-assembly 266 extends from an opening 292 at a first end 294 to an orifice 296 defined by a mister 298 located at a second end 300. A nut 302, integrally formed as part of the mist sub-assembly 266, is located between the externally-threaded portion 288 and the mister 298. Used in conjunction with nut 284 of the coupling sub-assembly 264, nut 302 enables the mist sub-assembly 266 to be secured to the coupling sub-assembly 264.

Figure 11:
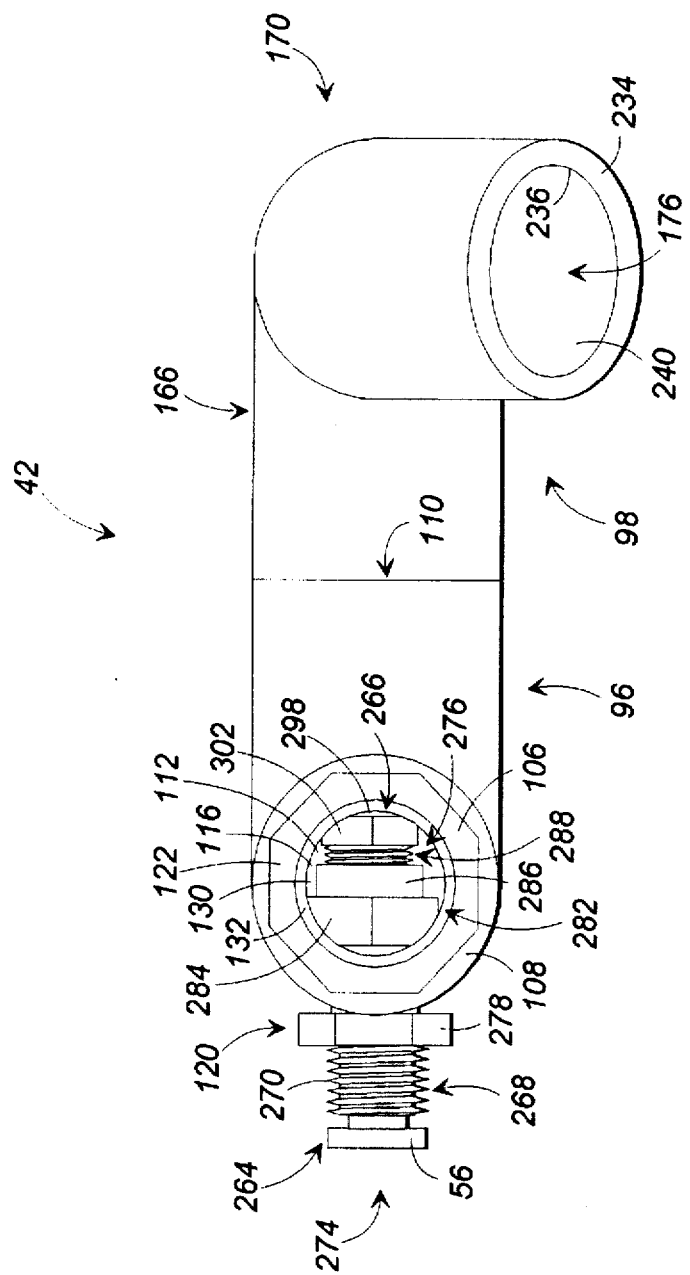
FIG. 11 is a top view of a misting assembly of FIG. 1.

The mist nozzle assembly 120, in accordance with the first preferred embodiment of the present invention, is also seen in FIG. 11, a top view of a misting assembly 42. The ferrule fitting 56 and the first end 274 of the coupling sub-assembly 264 are shown protruding from the wall 108 of the base portion 96. The second end 276 of the coupling sub-assembly 264, including the adapter 282, and the mist sub-assembly 266 are seen through the air intake portal 112 as they reside within the internal cavity 116 and extend toward the mist portal 110 and refining portion 98. The head 122 and threads 132 of the air intake coupling 106 surrounding the passageway 130 are also visible in FIG. 11.

FIGS. 12 and 13 display right and left side elevational views, respectively, of a misting assembly 42 in accordance with the first preferred embodiment of the present invention. The refining portion 98, including the first elbow segment 166, the straight segment 168, and the second elbow segment 170 (or delivery nozzle 170), is seen as it rises from the base portion 96. The delivery aperature 240 and delivery plane 237 (as indicated by dashed lines) of delivery nozzle 170 are also shown. The delivery plane 237 forms a delivery plane angle, "C", with the vertical direction indicated by "D". The delivery plane angle, "C", is measured clockwise beginning from the vertical direction, "D". It is important to note that while FIG. 12 illustrates the delivery plane angle, "C", as measuring approximately 45-degrees, it is preferable that, when in operation, the refining portion 98 is rotated relative to the base portion 96 so that the delivery plane 237 is coplanar with a vertical plane in which vertical direction "D" lies, resulting in delivery plane angle, "C", measuring 0-degrees (as shown in FIG. 6). In such a configuration, mist-laden air leaving the delivery aperature 240 exits, primarily, in a horizontal direction (indicated by "E"). However, it also is important to note that other delivery plane angles, "C", are acceptable and depend upon the environment in which the refining portion 98 resides.

Figure 14:
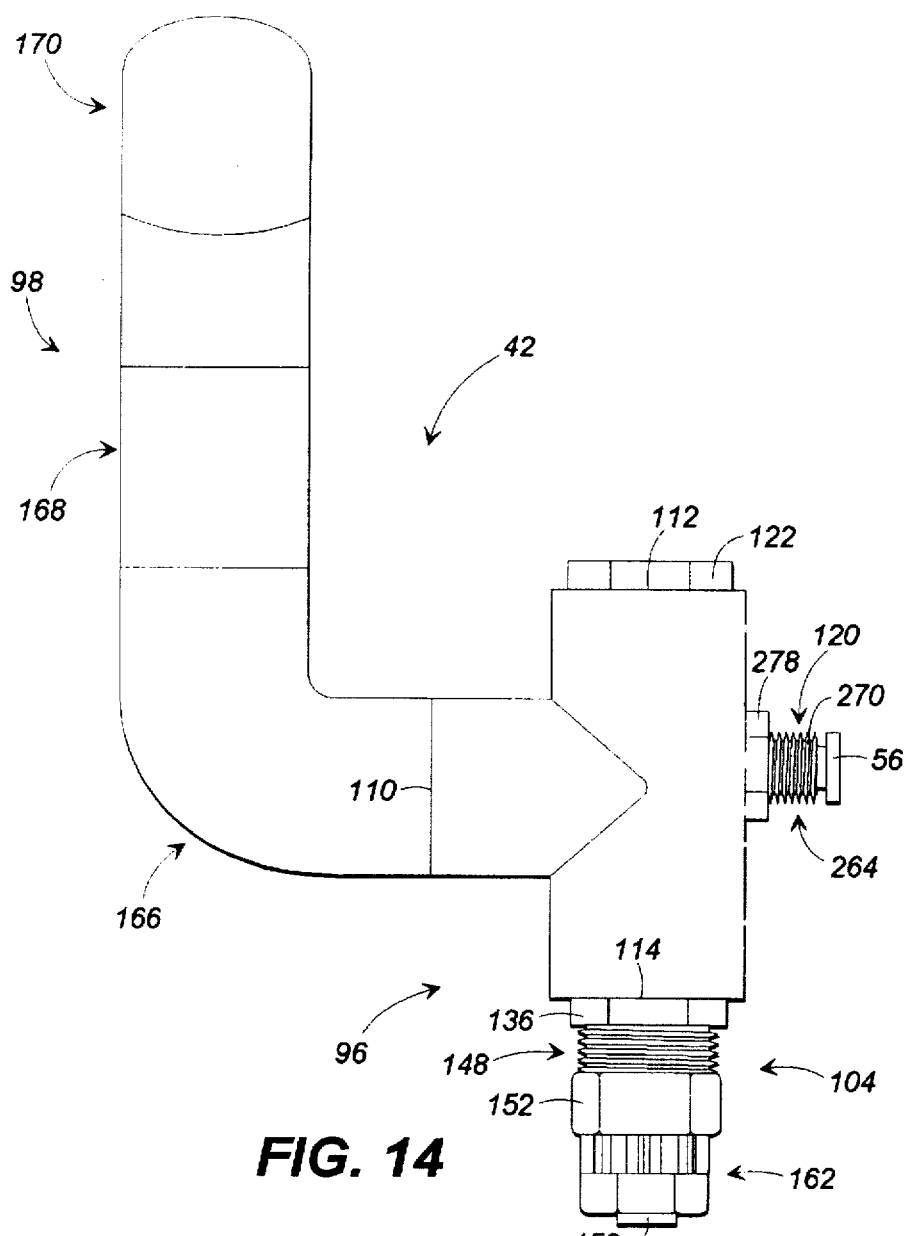
FIG. 14 is a back elevational view of a misting assembly of FIG. 1.
Figure 15:
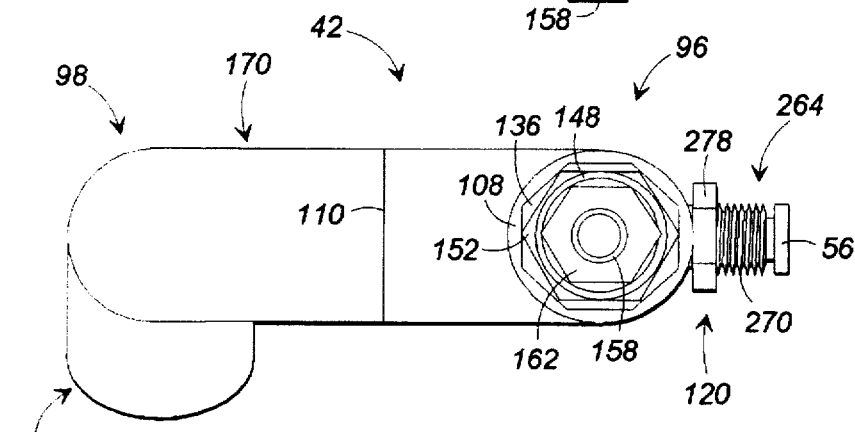
FIG. 15 is a bottom view of a misting assembly of FIG. 1.

FIGS. 12 and 13 also display the head 136 of the drain coupling 134 and the first externally-threaded portion 148 of the threaded-connector 146. Nut 152 and compression-type fitting 162 are also shown. In the left side elevational view of FIG. 13, the first end 274 of the coupling sub-assembly 264 (including the ferrule fitting 56, a nut 278, and threads 270) is seen secured in position to the base portion 96. Also visible in FIG. 13, is the head 122 of the air intake coupling 106 as it abuts the base portion 96. FIGS. 14 and 15, a back elevational view and bottom view, respectively, are included to improve the clarity of this disclosure by providing additional views of the misting assembly 42 and its component elements.

Figure 16:
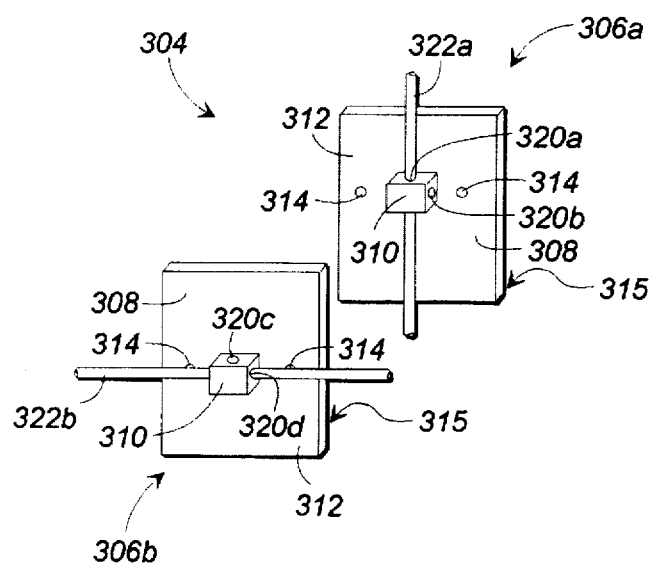
FIG. 16 is a front perspective, schematic view of a misting assembly mounting in accordance with a first preferred embodiment of the present invention.

In accordance with the first preferred embodiment of the present invention, a misting assembly 42 is, preferably, mounted to the side wall 44 of the refrigerated case 10 as shown in FIG. 1. The misting assembly 42 further includes mounting assemblies 304 illustrated schematically in the front perspective view of FIG. 16. A mounting assembly 304 comprises a cable-tie mount 306 having a base 308 and a cable-tie interface 310 protruding from the front 312 of the base 308. The base 308 has, preferably, a rectangular shape and defines holes 314 through which, preferably, self-tapping screws 316 (not shown) pass to secure the base 308 and, hence, the misting assembly 42 to the side wall 44. The base 308 also includes a back 315 to which double-sided tape 318 (not shown) is attached for improved mounting security. The cable-tie interface 310 defines pairs of opposed cable-tie aperatures 320 through which a cable-tie 322 passes before wrapping around the base portion 96 as seen in FIG. 5.

DESCRIPTION OF THE SECOND PREFERRED EMBODIMENT

Figure 17:
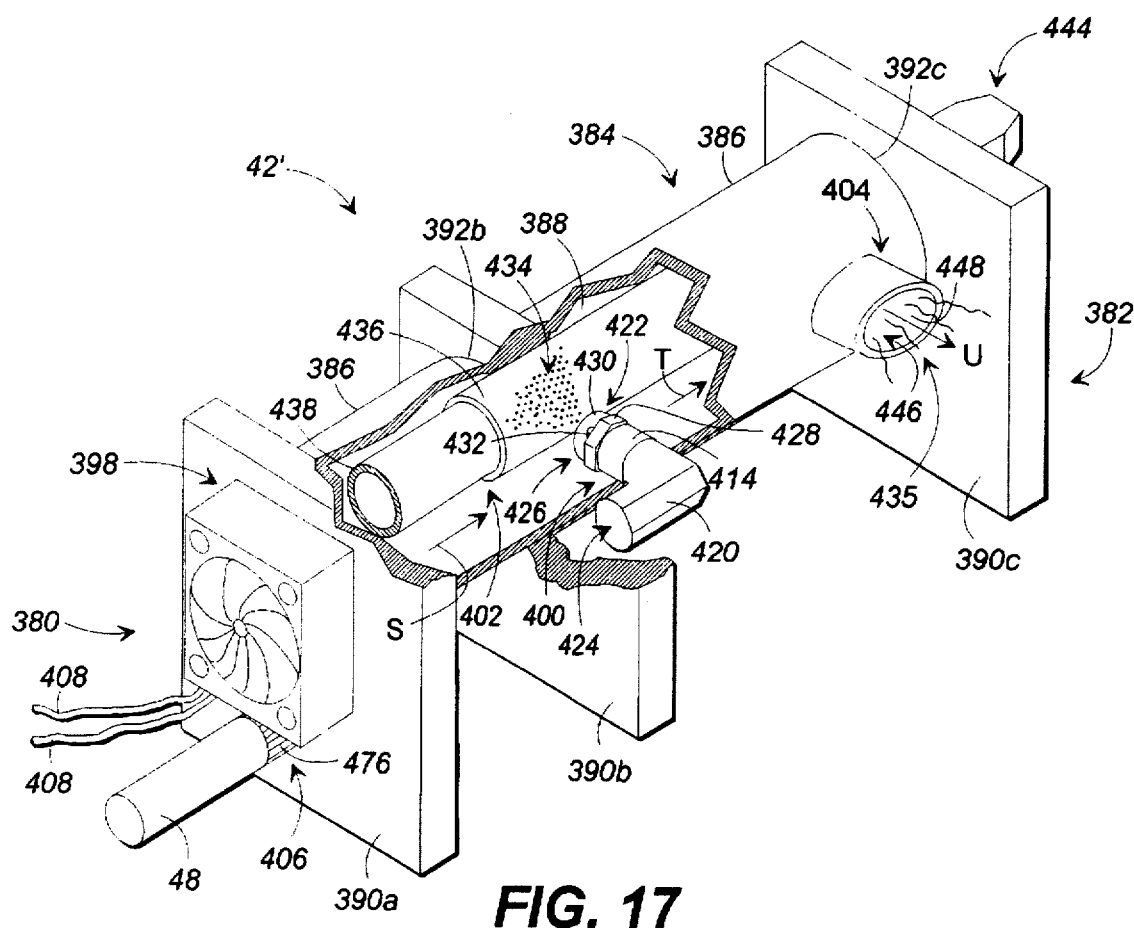
FIG. 17 is a front perspective, schematic view of a misting assembly, in accordance with a second preferred embodiment of the present invention.
Figure 18:
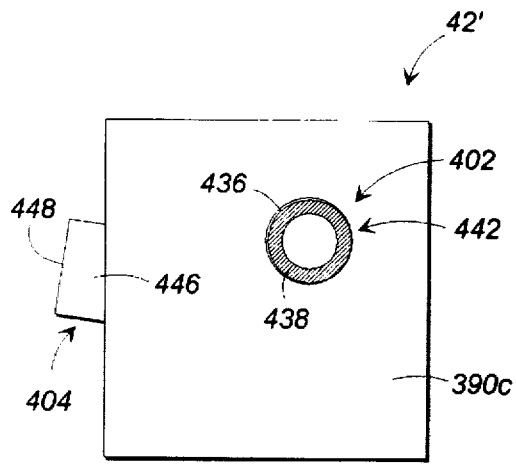
FIG. 18 is a right side elevational view of the misting assembly of FIG. 13.

FIG. 17 displays a front perspective, schematic view of a misting assembly 42' in accordance with a second preferred embodiment of the present invention. A portion of the misting assembly 42' is cut-away to reveal certain internal components. The misting assembly has a first end 380 and a second end 382 and comprises a refining portion 384 having a, generally, cylindrical shape. The refining portion 384 is, preferably, manufactured from conventional, plastic pipe used in the plumbing or piping industries. The refining portion 384 extends from the first end 380 to the second end 382 of the misting assembly 42', has a wall 386, and defines an internal cavity 388. The refining portion 384 is held in place by supports 390 that have a, generally, square shape and are manufactured, preferably, from solid plastic stock. Supports 390 define, generally, circular holes 392 that engage the wall 386, while receiving the refining portion 384. As seen in FIG. 17 and in the right side elevational view of FIG. 18 (where an electrical interconnect assembly 444 is not shown), the refining portion 384 extends entirely through hole 392b, but does not extend through holes 392a,c in supports 390a,c, respectively.

In accordance with the second preferred embodiment of the present invention, the misting assembly 42' also includes a fan 398, a mist nozzle assembly 400, an ultraviolet light assembly 402, a delivery nozzle 404, and a drain assembly 406. The fan 398 is mounted to support 390a at the first end 380 of the misting assembly 42'. Preferably, the fan 398 is a conventional DC fan requiring 24-volts and 250-milliamps of electrical current. Wires 408 extend from the fan 398 to the power supply logic assembly 74 residing in power supply box 76 (see FIG. 3) and supply the fan 398 with electrical power. A hole 410 (see FIG. 21) defined in support 390a enables air to flow from the fan 398 into the internal cavity 388 of the refining portion 384.

Figure 20:
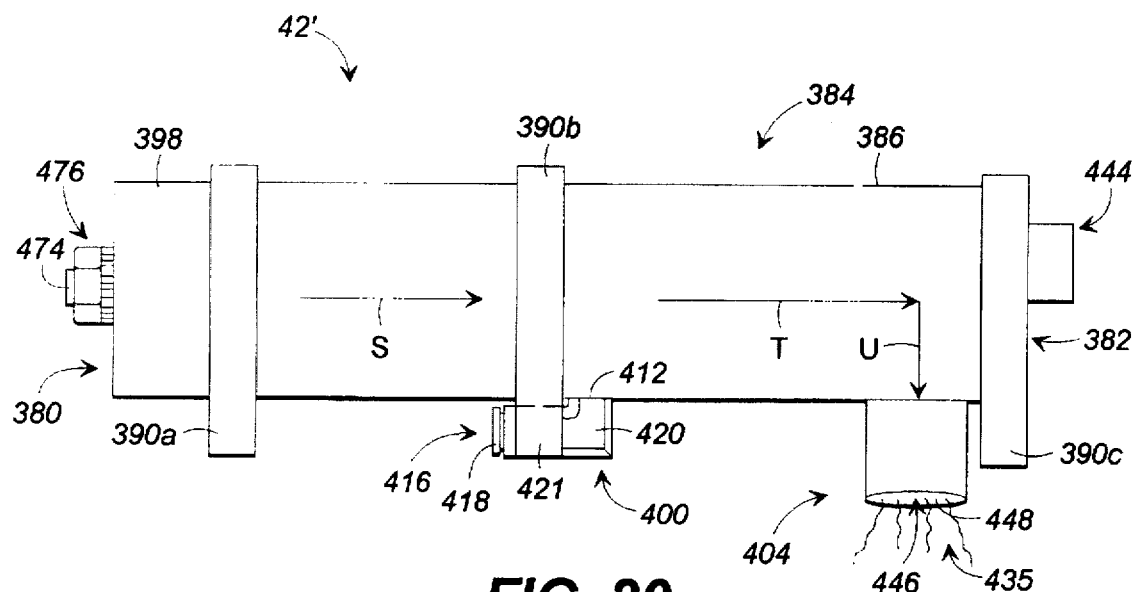
FIG. 20 is a top view of the misting assembly of FIG. 13.
Figure 21:
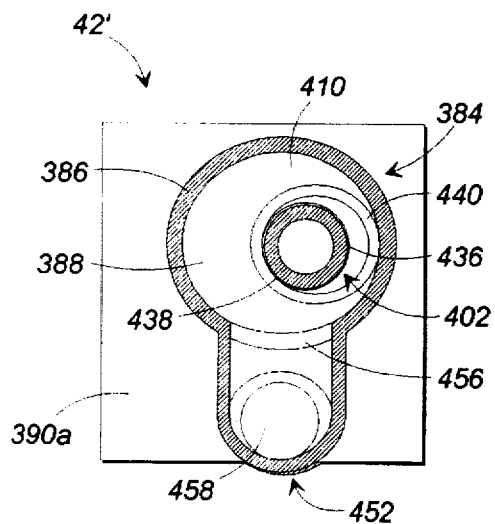
FIG. 21 is a sectional view of the misting assembly of FIG. 16 taken along line 21—21.

The mist nozzle assembly 400 extends through a hole 412 defined in the wall 386 of the refining portion 384 as illustrated in the front elevational and top views of FIGS. 20 and 21, respectively. The hole 412 is lined by a rubber bushing 414 to insure a tight fit between the hole 412 and mist nozzle assembly 400, thereby preventing water from leaking out of the hole 412. The mist nozzle assembly 400 includes a first end 416, residing outside the refining portion 384, having a, preferably, conventional ferrule fitting 418 for connection to a supply tube 40' (not shown). The ferrule fitting 418 is also connected, preferably, to a conventional 90-degree coupling 420 that extends through a hole 421, defined by support 390b, before entering the refining portion 384 through hole 412. The coupling 420 defines an internal passageway 424 (see FIG. 17) that is in fluid communication with the ferrule fitting 418. At a second end 426 of the mist nozzle assembly 400, located within the refining portion 384, a mist nozzle sub-assembly 422 is connected to the coupling 420. The mist nozzle sub-assembly 422 includes a nut 428, used to secure the mist nozzle sub-assembly 422 to the coupling 420, and a mister 430 having an orifice 432. The mist nozzle sub-assembly 422 defines an internal passageway (not visible) that places the orifice 432 into fluid communication with the internal passageway 424 of the coupling 420. The mister 430 is, preferably, a one gallon per hour nozzle.

Figure 22:
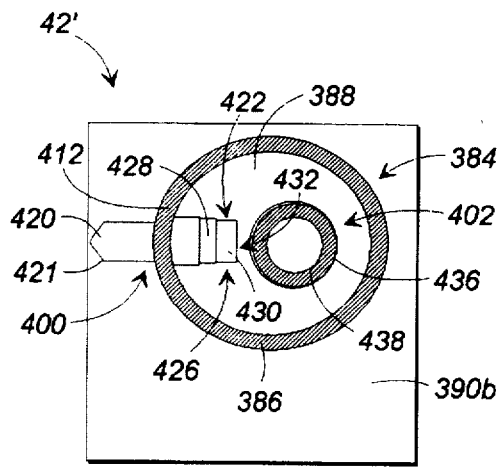
FIG. 22 is a sectional view of the misting assembly of FIG. 16 taken along line 22—22.

As shown in FIG. 17 and the sectional view of FIG. 22, the orifice 432 opposes the ultraviolet light assembly 402 so that a significant portion of the mist 434 strikes the ultraviolet light assembly 402 upon exiting, the orifice 432. The ultraviolet light assembly 402 comprises a glass tube 436, extending within the internal cavity 388, that houses an ultraviolet light 438. The glass tube 436 is held in position by a glass tube support 440 (see FIG. 21) and a hole 442, defined by support 390c, through which the glass tube 436 passes (see FIG. 18). The glass tube support 440 has a, generally, cylindrical shape and is, preferably, manufactured from a small piece of conventional plastic pipe used by the plumbing and piping industries. The glass tube support 440 is secured, preferably, by cementing to the wall 386 of the refining portion 384. The ultraviolet light assembly 402 also includes an electrical interconnect assembly 444 attached to the ultraviolet light 438 at the second end 382 of the misting assembly 42'.

Figure 23:
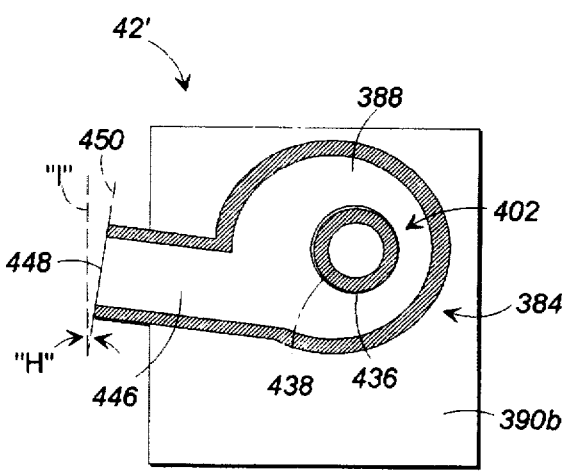
FIG. 23 is a sectional view of the misting assembly of FIG. 16 taken along line 23—23.

In accordance with the second preferred embodiment of the present invention and as shown in FIGS. 17–20 and FIG. 23, the delivery nozzle 404 extends from the refining portion 384 near the second end 382 of the misting assembly 42'. The delivery nozzle 404 defines an internal cavity 446 and a delivery aperature 448 that are in fluid communication with the internal cavity 388 of the refining portion 384. The delivery aperature 448, as shown in FIG. 23, is coplanar with a delivery plane 450 (indicated by dashed lines). The delivery plane 450 forms an angle, "H", with a vertical plane (denoted by dashed line 'T') that, preferably, measures 7.5 degrees.

Figure 19:
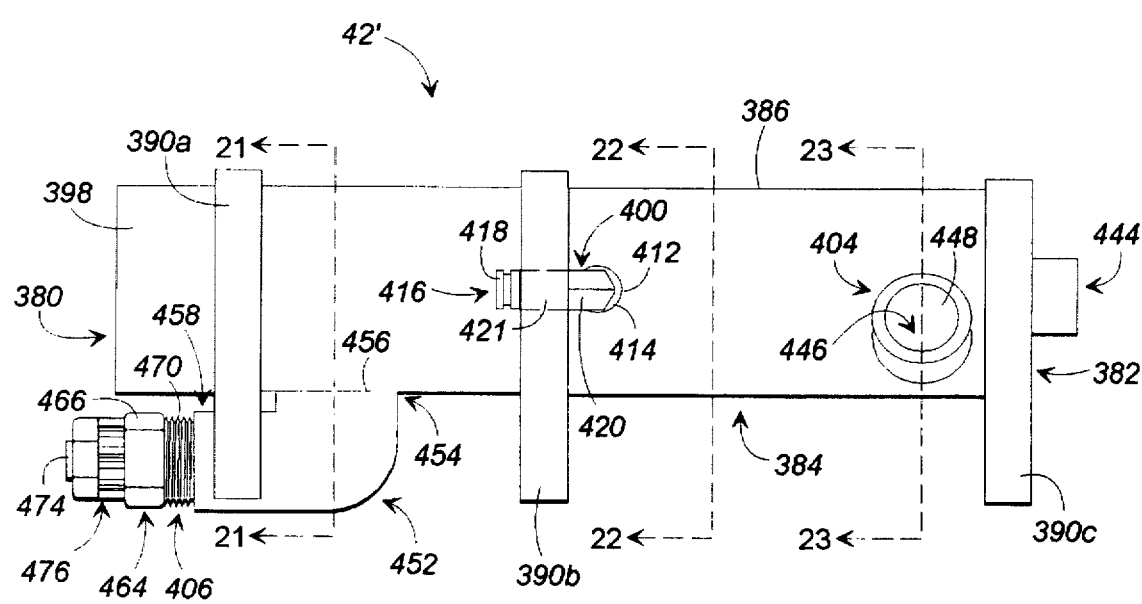
FIG. 19 is a front elevational view of the misting assembly of FIG. 13.

The drain assembly 406 of the second preferred embodiment is connected to the refining, portion 384 near the first end 380 of the misting assembly 42' as shown in FIGS. 17 and 19. The drain assembly 406 includes an elbow 452 having, a first end 454 joined to a drain portal 456 defined by the refining portion 384. The drain portal 456 is, preferably, located at the lowest point of the refining portion 384 and below the mist nozzle assembly 400. The elbow 452 is, preferably, a conventional molded-plastic 90-degree elbow used by the plumbing and piping industries and has a second end 458 that includes internal threads (not visible). An internal passageway (not visible) places the first and second ends 454, 458 in fluid communication. A threaded-coupling 464 having a nut 466 and defining an internal passageway (not visible) is threadedly connected to the second end 458 of the elbow 452. Preferably, the threaded-coupling 464 is a conventional, barb-type coupling used by the plumbing and piping industries. The nut 466 separates a first externally-threaded portion 470 from a second externally-threaded portion (not visible). The first externally-threaded portion 470 engages and resides partially within the second end 458 of the elbow 452. The threaded-coupling 464 also includes a barb 474 extending from its second externally-threaded portion. A drain tube 48 is connected to the barb 474 and a compression-type fitting 476 having, internal threads (not visible) fits over and engages the second externally-threaded portion of the threaded-coupling 464. The compression-type fitting is a conventional plastic compression-type fitting used by the plumbing and piping industries.

OPERATION OF THE MOST PREFERRED EMBODIMENTS

Once installed, water is supplied to the mist-refining humidification system 12 of the most preferred embodiments of the present invention through tap supply hose 32 as illustrated in FIG. 2. When the intake valve assembly 62 is closed, water flow is stopped, allowing maintenance or repair on the components inside the water control unit 34, such as cleaning the filter 64. When the intake valve assembly 62 is open, water flows through the filter 64 Which utilizes a screen to remove dirt and particulates from the water which could potentially interfere with the operation of other components of the mist-refining humidification system 12. One example of an acceptable filter 64 is a conventional mesh screen filter.

In the most preferred embodiments of the present invention, water leaves the filter 64 and travels through a low pressure switch 70 before reaching the high pressure pump 66. The low pressure switch 70 constantly monitors the pressure of the water leaving the filter 64. If the water pressure falls below a predetermined level, the low pressure switch 70 provides a warning signal, via the feedback signal lines 72, to the power supply logic assembly 74. Upon receiving a low pressure warning signal, the power supply logic assembly 74 prevents electrical current from reaching the electric motor 68, thereby shutting down the high pressure pump 66 and preventing damage to the pump 66 that would, otherwise, result from running the pump 66 with too little incoming water. The power supply logic assembly 74 also disables the supply of electrical current to the solenoid actuated valve 78, resulting in closure of the valve 78. In the most preferred embodiments of the present invention, the low pressure switch 70 includes a polyurethane (polyether) diaphragm and has a mechanical contact rating of at least 4 amps for voltages as high as 250 VAC, a proof pressure of 125 psi (pounds per square inch), and a burst pressure of 160 psi. In the most preferred embodiments, when the water pressure falls below 5 psi, the low pressure switch 70 generates the low pressure warning signal to the power supply logic assembly 74.

The high pressure pump 66, in accordance with the most preferred embodiments of the present invention, supplies water to the supply header 38 and, hence, the misting assemblies 42, 42', at an increased pressure ranging between 120 psi and 250 psi. Unless a low water pressure signal is generated by the low pressure switch 70, the high pressure pump 66, preferably, runs continuously to avoid damage to the pump 66 that would, otherwise, result by periodically cycling the pump 66 on and off whenever pressurized water was required by the misting assemblies 42, 42'. Preferably, the high pressure pump 66 delivers water to the supply header 38 at approximately 150 psi. One example of an acceptable high pressure pump 66 and motor 68 combination is a pump that delivers at least 20 gallons per hour at a pressure between 150 psi and 180 psi and a ¼-horsepower motor 68 that operates at 110 VAC. Other alternate embodiments of the present invention include pumps supplying higher or lower pressures in accordance with the use of alternate mist nozzle assemblies 102 to produce acceptable mist 46 as described herein.

A pump bypass loop (not visible) and pressure guage 82 enable manual adjustment of the pump output pressure by an operator. More importantly, the pump bypass loop maintains a constant pump output pressure, regardless of the number of misting assemblies 42, 42' contained in the mist-refining humidification system 12. Thus, one or more misting assemblies 42, 42' may be added to or removed from the mist-refining humidification system 12 while not affecting the water pressure to each of the misting assemblies 42, 42'. Since the water pressure affects the quality of the mist emitted from the mist nozzle assemblies 102, the pump bypass loop helps to ensure optimum mist quality.

After leaving the high pressure pump 66 and passing through the pressure guage 82, water travels thorough a solenoid-activated valve 78 which is controlled by the power supply logic assembly 74 working in conjunction with the timer 52. The timer 52 is selectively programmable to a variety of on/off cycle combinations and may be turned off completely via the slide switch 88. One example of an acceptable timer 52 is a repeat cycle timer having a relay output rated at 10 amps, a dual input voltage capability (110 VAC or 24 VAC), a multi-timing range of 0.1 seconds to 10 hours, an "on" dial for setting the duration of "on" time, and an internal "off" adjustment for setting the duration of "off" time.

In the most preferred embodiments of the present invention, if the timer 52 is turned off via the slide switch 88, no electrical current is supplied to the solenoid-actuated valve 78 by the power supply logic assembly 74, thereby causing the valve 78 to remain in its normally, closed state and causing no water to be supplied to the supply header 38. If the timer 52 is turned on via the slide switch 88, the timer 52 functions according to the setting of the timing adjustment knob 90 (which controls operation of the first timing circuit) and the pre-determined setting of the second timing circuit. The first timing circuit controls the "on" time of the misting assemblies 42, 42' and is set by operator selection of an adjustment knob 90 position. The second timing circuit controls the "off" time of the misting assemblies 42, 42' and is, preferably, set by an installer to approximately 5 seconds. The timer 52 alternates between "on" and "off" periods continuously, thereby enabling the power supply logic assembly 74 to alternately supply current to the solenoid-actuated valve 78 via control lines 80 and causing the valve 78 to open and close in a cyclical manner to provide water to the supply header 38. Additionally, in accordance with the second most preferred embodiment of the present invention, cycling of the timer 52 causes electrical current to be supplied in a cyclical manner to the fan 398, via the power supply wires 408 connected to the power supply logic assembly 74, thereby turning the fan 398 "on" and "off" whenever the solenoid-actuated valve 78 is opened or closed, respectively. It should be understood that these "on" and "of" times are selectively variable for use with various types of products and environments in accordance with the objects of the present invention.

As highly pressurized water is supplied to the supply header 38, the water is transferred from the water control unit 34 on a path through both the supply header 38 and the supply tubes 40 to the misting assemblies 42, 42'. In the most preferred embodiments of the present invention, the high pressure pump 66 also functions as a check valve to prevent water from flowing in the reverse direction toward the low pressure switch 70 and filter 64. Therefore, when the solenoid-actuated valve 78 is closed, the water pressure at the delivery side of the pump 66 remains relatively constant. However, immediately after the solenoid-actuated valve 78 is closed, the water pressure in the supply header 38 and supply tubes 38 begins to fall off since the misting assemblies 42, 42' remain open. When the timer 52 again opens the solenoid-actuated valve 78, the water pressure in the supply header 38 and the supply tubes 40 is returned to the optimum pressure during the initial portion of the "on" cycle. The amount of water pressure lost during the "off" period depends, at least in part, on the length of the "off" period and the number of misting assemblies 42, 42'.

Figure 24:
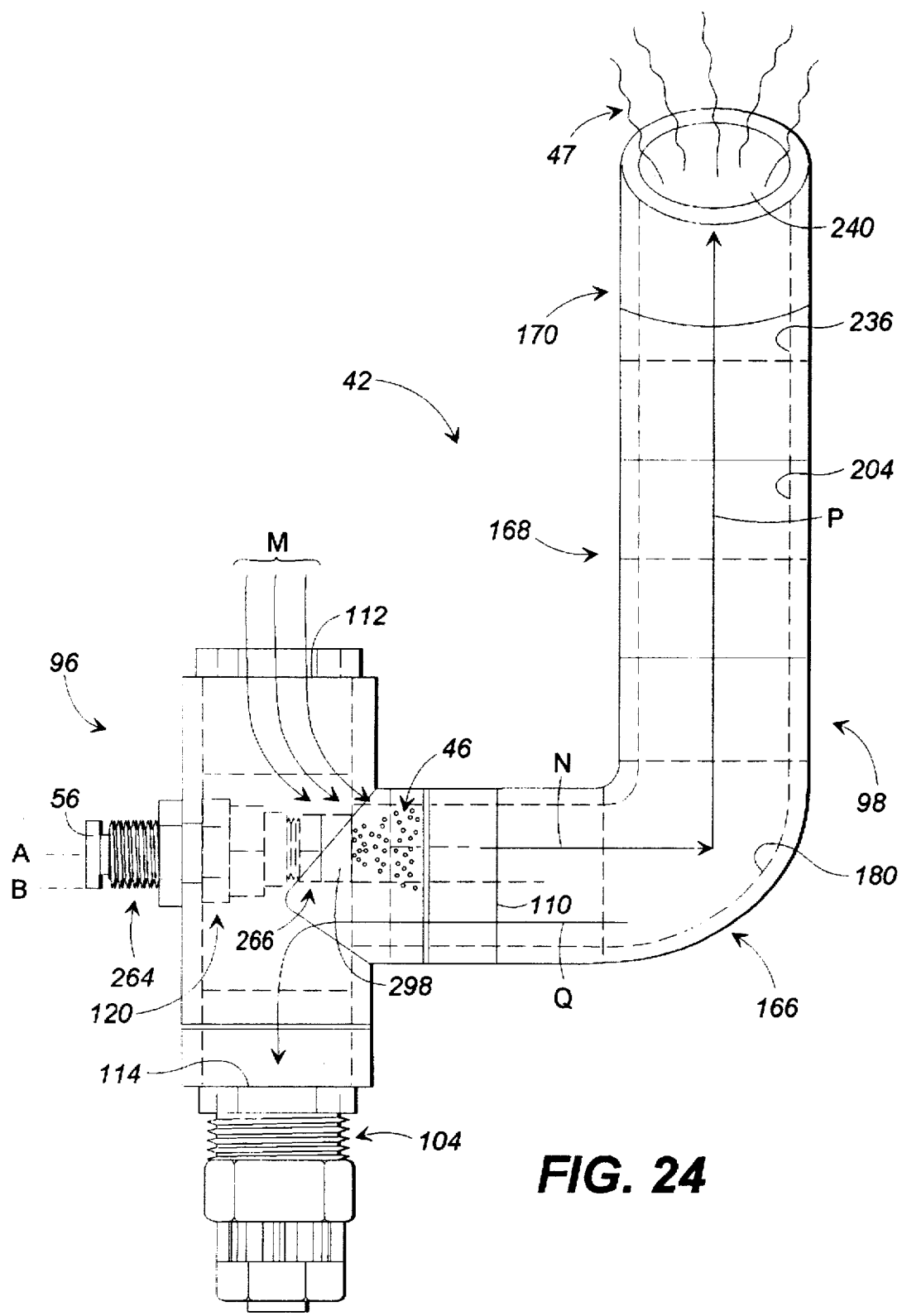
FIG. 24 is a front elevational view of misting assembly of FIG. 1, showing the directions of air, mist-laden air, and drainage.

Referring now to FIGS. 2 and 24, as the pressurized water reaches the misting assembly 42 of the first preferred embodiment, the water enters the mist nozzle assembly 120 through the ferrule fitting 56. The water then travels through the coupling sub-assembly 264, via the internal chamber 272, before entering the mist sub-assembly 266. After entry into the mist sub-assembly 266, the water passes through its internal passageway to reach the mister 298. The mist sub-assembly 266 accepts the water from the internal passageway 285 of the coupling sub-assembly 264 and emits a mist 46 through the orifice 296 in a mister-specific spray pattern. As shown in FIG. 24, the mist 46, containing a variety of different sized, independent water droplets, is emitted into a stream of air flowing through the air intake portal 112 and around the mist nozzle assembly 120, indicated by arrows "M". It is believed that the flow of air is induced into the misting assembly 42 by the entrainment of air within the high pressure mist 46 and the subsequent resulting release of mist-laden air 47 through the delivery aperature 240 of the delivery nozzle 170. Upon emission, each of the droplets of the mist 46 has a directional component in the initial direction of the mist migration path, designated by arrow "N" and discussed below. In accordance with the first preferred embodiment of the present invention, water droplets of the mist 46 vary in size from 5 microns to over 60 microns. One example of an acceptable mister 298 sprays mist in a 45-degree conical spray pattern at a rate of 0.8–1.3 gallons per hour when receiving water at a pressure of 150 psi. It is understood that the pressure of the water supplied to the mister 298 affects the size of the water droplets of the mist 46, thus the water pressure is, preferably, maintained within an optimum range during the "on" period to induce emission of the finest possible mist 46. This optimum range of pressure for the preferred mister 298 includes pressures greater than 120 psi.

As the mist 46 leaves the mister 298, it mixes with the flowing air to form mist-laden air 47 and passes through mist portal 110 before entering the refining portion 98 of the misting assembly 42. The mist-laden air 47 travels in the initial direction (i.e., a lateral direction) of the mist migration path, "N", as defined by the refining portion 98. Which passing through the first elbow 166, the mist-laden air 47 changes direction into a second direction of the mist migration path, designated by arrow "P". In FIG. 24, the second direction of the mist migration path, "P", is vertical. However, because the refining portion 98 is rotatable relative to the base portion 96, the second direction of the mist migration path, "P", may have direction components in the lateral and vertical directions (as shown by the preferred orientation of the refining portion 98 in FIG. 6). After passing through the first elbow 166, the mist-laden air 47 passes through the remaining elements of the refining portion 98, straight segment 168 and delivery nozzle 170, before being released into the controlled environment via the delivery aperature 240.

While flowing through the refining portion 98 of the misting assembly 42, the individual droplets of mist 46 in the mist-laden air 47 tend to repeatedly come into contact with the inner surfaces 180, 204, 236 of the refining portion 98 components. It is believed that after making contact, the larger droplets either tend to collect on the inner surfaces 180, 204, 236 (and subsequently join other larger droplets flowing in a drainage direction, designated by arrows "Q") or tend to break up into smaller droplets that continue along the mist migration path. It is also believed that the droplets of the mist 46 may tend to bounce after making contact with the inner surfaces 180, 204, 236 of the refining portion 98 components. Such bouncing results in droplets that, while flowing, generally, in the current direction of the mist migration path (as defined by the refining portion 98), also flow in various secondary directions. It is believed that changing the direction of the mist migration path, in accordance with the present invention, introduces more turbulence into the mist-laden air 47 and thus, induces more bouncing of the droplets. As a result, each droplet tends to come into contact with the inner surfaces 180, 204, 236 of the refining portion 98 components with increased frequency, thereby encouraging the break up of larger droplets and, hence, producing mist-laden air 47 having a finer average droplet size. It is important to note that other factors also potentially contribute to the production of mist-laden air 47 having a finer average droplet size.

In accordance with the first preferred embodiment of the present invention, the drain portal 114 and drain assembly 104 are located distant from and below the orifice 296 of the mist nozzle assembly 120. Also, the centerline of the mist nozzle assembly 120, "A", is located above the centerline of the mist portal 110, "B". It is believed that these design considerations tend to reduce fouling of the mister 298 possibly created by larger droplets draining from the misting assembly 98 in the drainage direction, "Q". By reducing possible fouling of the mister 298, less mist 46 is converted into immediate drainage and more mist 46 becomes mixed with flowing intake air.

Referring now to FIGS. 2 and FIGS. 17–23, as the pressurized water reaches the misting assembly 42' of the second preferred embodiment of the present invention, the water enters the mist nozzle assembly 400 through the ferrule fitting 418. The water then travels through the coupling 420 before entering the mist nozzle sub-assembly 422. After entry into the mist nozzle sub-assembly 422, the water passes through the internal passageway 424 to reach the mister 430. The mister 430 accepts the water from the internal passageway 424 and emits a mist 434 through the orifice 432 in a nozzle-specific spray pattern. As shown in FIGS. 17 and 20, the mist 434, containing a variety of different sized, independent water droplets, is emitted into a stream of air (designated by arrow "S") flowing from the fan 398, through the internal cavity 388, and around the mist nozzle sub-assembly 422. Upon emission, each of the droplets of the mist 434 has a directional component toward the opposing glass tube 436. It is believed that many of the droplets contact the glass tube 436 and either bounce off the glass tube 436 or are broken up into smaller droplets before mixing with air supplied by the fan 398 to form mist-laden air 435. It is also believed that the presence of ultraviolet light, emitted within the refilling portion 384 by the ultraviolet light 438, tends to disinfect the inner wall of the refining portion 384 from bacterial colonization, thereby tending to reduce the numbers of harmful bacteria that may be present in the mist 434 and, hence, in the mist-laden air 435.

In accordance with the second preferred embodiment, the mist-laden air 435 travels along the mist migration path defined by the refining portion 384 in an initial direction, "T", toward the second end 382 of the misting assembly 42'. As the water droplets of the mist-laden air 435 travel turbulently through the internal cavity 388 of the refilling portion 384, it is believed they repeatedly come into contact with the wall 386 of the refining portion 384 and glass tube 436, thereby refining the mist-laden air 435 to contain a smaller average droplet size as explained above with respect to the first preferred embodiment of the present invention. Upon nearing the second end 382 of the misting assembly 42', the mist migration path changes direction into a second direction toward the delivery nozzle 404, as illustrated by the arrow, "U". In following the mist migration path, the mist-laden air 435 is directed through the delivery nozzle 404 for release into the controlled environment.

Attention is now directed to the specification and claims of U.S. patent application Ser. No. 07/830,190, filed Jan. 31, 1992, allowed Sept. 9, 1992, as U.S. Pat. No. 5,193,354 and to the specification and claims of U.S. patent application Ser. No. 07/980,301, filed Nov. 23, 1992, allowed Apr. 6, 1994, as U. S. Pat. No. 5,350,117 and to the specification and claims of U.S. patent application Ser. No. 08/278,268, filed Jul. 21, 1994, now abandoned, which are hereby incorporated by reference.

Whereas this invention has been described in detail with particular reference its most preferred embodiments, it will be understood that variations and modifications can be effected within the spirit and scope of the invention, as described herein before and as defined in the appended claims.

We claim:

1. An apparatus for producing a refined, droplet-laden gaseous composition, said apparatus comprising:

a control means connected to a water source for supplying water at a constant pressure greater than tap pressure;

a mist nozzle means located entirely within a controlled environment for transforming a liquid into a mist and injecting said mist in a predominantly lateral direction to induce a gaseous composition to flow into said apparatus, said mist nozzle means extending in said lateral direction and defining a central axis in said lateral direction, said mist being comprised of a plurality of disconnected droplets of various sizes;

a tubing means for transferring water from said control means to said mist nozzle means;

a refining means located adjacent said mist nozzle means and within the controlled environment for directing said mist initially in a predominantly lateral direction, for converting larger droplets of said plurality of disconnected droplets of said gaseous composition flowing therein into smaller droplets of said plurality of disconnected droplets, for removing larger droplets of said plurality of disconnected droplets to create a refined, droplet-laden gaseous composition and to create a drainage flow of removed larger droplets flowing therein, and for directing said drainage flow of removed larger droplets to travel adjacently beneath said mist nozzle means in a predominantly lateral direction opposed to said lateral direction in which said mist nozzle means extends, said refining means including a delivery means for delivering said refined, droplet-laden gaseous composition into the controlled environment;

an intake means disposed entirely at an elevation above said mist nozzle means for enabling said gaseous composition to flow into said apparatus;

a drain means located entirely at an elevation below said mist nozzle means for directing said drainage flow of removed larger droplets away from said refining means, said mist nozzle means being positioned between said intake means and said drain means; and, a base means located within the controlled environment for supporting said mist nozzle means and for attaching to a structure of the controlled environment, said base means including a lateral segment connected to said lateral segment of said refining means, said mist nozzle means extending within said lateral segment of said base means;

wherein the air pressure of the controlled environment proximate to said delivery means measures at least atmospheric pressure.

2. The apparatus of claim 1 wherein, said refining means includes a lateral segment defining a central lateral axis at an elevation midpoint therein, and said central axis of said mist nozzle means is defined at an elevation above said central lateral axis of said lateral segment.

3. The apparatus of claim 2, wherein said delivery means is rotatably positionable about said central lateral axis of said refining means at a plurality of elevations relative to said central lateral axis of said refining means and relative to said mist nozzle means.

4. The apparatus of claim 3 wherein, said refining means further includes a longitudinal segment connected between said lateral segment and said delivery means, said longitudinal segment defines a longitudinal axis therein, and said delivery means is rotatable about said longitudinal axis of said longitudinal segment.

5. The apparatus of claim 1, wherein said control means includes timer means for automatically supplying water to said mist nozzle means during a first interval of time and for automatically ceasing the supply of water to said mist nozzle means during a second interval of time.

6. The apparatus of claim 5, wherein said control means further includes means for independently setting said first interval of time and said second interval of time.

* * * * *